United States Patent
Rodriguez et al.

(10) Patent No.: US 7,373,650 B1
(45) Date of Patent: May 13, 2008

(54) APPARATUSES AND METHODS TO ENABLE THE SIMULTANEOUS VIEWING OF MULTIPLE TELEVISION CHANNELS AND ELECTRONIC PROGRAM GUIDE CONTENT

(75) Inventors: Arturo A. Rodriguez, Norcross, GA (US); Dean F. Jerding, Roswell, GA (US); Robert O. Banker, Cumming, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/558,556

(22) Filed: Apr. 26, 2000

Related U.S. Application Data

(60) Provisional application No. 60/178,970, filed on Feb. 1, 2000.

(51) Int. Cl.
*H04N 5/445* (2006.01)
*H04N 5/45* (2006.01)

(52) U.S. Cl. ............ 725/41; 725/39; 725/40; 348/565

(58) Field of Classification Search ............ 725/37–42; 348/565
See application file for complete search history.

(56) References Cited

U.S. PATENT DOCUMENTS

| | | | | |
|---|---|---|---|---|
| 4,809,069 A | * | 2/1989 | Meyer et al. ............... | 348/446 |
| 5,485,221 A | | 1/1996 | Banker et al. ............... | 348/563 |
| 5,815,145 A | * | 9/1998 | Matthews, III ............... | 725/41 |
| 5,828,420 A | * | 10/1998 | Marshall et al. ............... | 725/47 |
| 5,844,620 A | | 12/1998 | Coleman et al. | |
| 5,900,916 A | * | 5/1999 | Pauley ............... | 725/59 |
| 5,903,314 A | | 5/1999 | Niijima et al. | |
| 6,115,080 A | * | 9/2000 | Reitmeier ............... | 348/731 |
| 6,177,931 B1 | * | 1/2001 | Alexander et al. ............ | 725/52 |
| 6,212,680 B1 | * | 4/2001 | Tsinberg et al. ............... | 725/39 |
| 6,243,145 B1 | * | 6/2001 | Schlarb et al. ............... | 725/39 |
| 6,289,170 B1 | * | 9/2001 | Nagano et al. ............... | 386/83 |
| 6,349,410 B1 | * | 2/2002 | Lortz ............... | 725/110 |
| 6,384,869 B1 | * | 5/2002 | Sciammarella et al. ..... | 348/564 |
| 6,405,372 B1 | * | 6/2002 | Kim et al. ............... | 725/50 |
| 6,493,038 B1 | * | 12/2002 | Singh et al. ............... | 348/565 |
| 6,505,348 B1 | * | 1/2003 | Knowles et al. ............... | 725/49 |
| 6,563,515 B1 | * | 5/2003 | Reynolds et al. ............ | 345/721 |
| 6,590,618 B1 | * | 7/2003 | Park et al. ............... | 348/734 |

FOREIGN PATENT DOCUMENTS

| | | |
|---|---|---|
| EP | 0725538 | 8/1996 |
| WO | WO 96/17473 | 6/1996 |
| WO | WO 98/17064 | 4/1998 |
| WO | WO 98/37695 | 8/1998 |

* cited by examiner

*Primary Examiner*—Hunter B. Lonsberry

(57) ABSTRACT

A Digital Home Communication Terminal (DHCT) including a plurality of tuners, each of which can select one of a plurality of transmission channels provided by a Digital Broadband Delivery System (DBDS). The multiple tuners enable the DHCT to tune to a plurality of downstream media and data transmissions, thereby allowing a subscriber to tune simultaneously to multiple channels and content transmitted in the downstream transmission via the DBDS, an advantage over conventional DHCTs. The present invention enables subscribers to receive and view multiple channels and associated content, including electronic program guide information, at will. Furthermore, using the multiple-tuner DHCT of the present invention, subscribers can view multiple television stations and program content simultaneously, without degradation to television signals or pictures.

36 Claims, 7 Drawing Sheets

APPARATUSES AND METHODS TO ENABLE THE SIMULTANEOUS VIEWING OF MULTIPLE TELEVISION CHANNELS AND ELECTRONIC PROGRAM GUIDE CONTENT

CROSS REFERENCE TO RELATED APPLICATIONS

This application claims priority to the Provisional Application Ser. No. 60/178,970 filed Feb. 1, 2000.

TECHNICAL FIELD

The present invention relates to a digital home communication terminal having multiple tuners. More particularly, the invention relates to a digital home communication terminal that enables subscribers to simultaneously view, on a single television screen, a displayed presentation of the motion video pictures of multiple television channels and electronic program guide information for each of the respective television channels.

BACKGROUND

Over the past twenty years there has been a substantial increase in the number and types of programming available to television viewers. In a typical American household, it is not uncommon for viewers to have available fifty or more television stations, and in some cases viewers have more than one hundred channels to choose from. Although the large number of programs are appreciated by those viewers who desire a wide variety of program selections at any given hour of the day, the high number of channels often makes it difficult for viewers to efficiently locate any single program. Furthermore, due to the ever increasing number of channels and programs at the fingertips of the television viewer, viewers often have difficulty in deciding what station or program to watch. For instance, although a viewer may locate an interesting program, the viewer may still spend a considerable amount of time navigating the remaining channels to confirm that there isn't a more desirable program selection.

Aiding television viewers with program selection has been addressed in a variety of manners. For instance, many cable systems feature a preview channel that offers viewers a preview guide as to the programs being broadcast on each channel. Typically, preview guides indicate the programs currently airing on each channel, as well as programs to be aired within a certain period of time, such as during the next half hour or hour. Preview guides scroll program information on the screen so that the TV viewer can determine in a passive manner what is being shown on each channel. However, this method of providing TV viewers information regarding programming has some major drawbacks. First, subscribers cannot view a program and the preview guide at the same time, because the preview guide is on a dedicated channel. Second, the viewer is subjected to the latency of tuning to the preview channel and then to a desired channel. Third, because the preview guide is not interactive or cannot be controlled by the viewer, the viewer must wait until the preview guide posts information regarding the programming for each of the channels, which is inconvenient for a large number of channels. Because preview guides may post information regarding the channels sequentially according to channel number, a viewer may be forced to watch the preview information for every channel until the viewer's desired channel is listed. Further drawbacks include the fact that preview channels offer limited information about programs, and only show program information for shows on air or for a short time interval immediately thereafter.

More recently, satellite systems and cable television systems have offered viewers interactive menus that allow viewers access to information regarding programming that is currently being aired and programming that is to be aired in the near future. Using these systems, viewers can access a program guide that allows viewers to interactively scroll through available programming, usually based on times and channels. Furthermore, viewers can view details regarding programs scheduled to be aired at a specific time on a specific channel in the near future, such as the length of the program, a program summary, the program players or hosts, the program's rating, as well as other data. Subscribers of these systems can also obtain information regarding the particular program they are viewing, at the time they are viewing the programming. For instance, a viewer can watch a program and at the same time, retrieve information regarding that program whereby the program information is overlayed on the motion picture. However, these systems face some major drawbacks.

For example, viewers can only receive one channel at any given time, although viewing separate channels at the same time is a desirable aspect to subscribers, as evidenced by television sets on the market today offering picture-in picture. Furthermore, although some systems are capable of presenting programming guide information to subscribers using a graphical user interface, which can provide information for multiple channels, the video picture of the currently tuned channel is the only one presented. Additionally, satellite systems do not offer two-way interactivity to enhance the electronic program guide graphical user interface presentations with additional information, without delay, when the viewer requests it. Information requested by subscribers regarding satellite programming is also often slow because there might be a substantial time lapse before a satellite dish can receive the viewer-requested program information. Furthermore, viewers cannot view programming broadcast on multiple channels together with program information for each of those respective channels simultaneously on the same screen.

Therefore, what is needed is an interactive digital home communication terminal that enables TV viewers to display motion video pictures of multiple channels at the same time, while simultaneously enabling viewers to obtain on-demand programming information for one or more programs without having their program viewing interrupted and with little or no latency. Furthermore, it would be advantageous for viewers to interact with the data and graphics information displayed through the home communication terminal, to communicate with the terminal, and to access information rapidly, such as Internet data, so that a more comprehensive and entertaining experience is facilitated.

SUMMARY OF THE INVENTION

A Digital Home Communication Terminal (DHCT) according to the present invention includes a plurality of tuners wherein each can select one of a plurality of transmission channels provided by a Digital Broadband Delivery System (DBDS). Using multiple tuners enables the DHCT of the present invention to tune to a plurality of downstream media and data transmissions, thereby allowing a subscriber to tune simultaneously to multiple channels and content transmitted in the downstream transmission via the DBDS, an advantage over conventional DHCTs. Because conventional DHCTs typically contain only one in-band tuner, which can tune to one frequency at a time, conventional DHCTs generally are limited to receiving data from one in-band frequency, resulting in the inability to display multiple channels and content (such as electronic program guide content) simultaneously under all possible circumstances. Furthermore, because conventional DHCTs receive electronic program guide (EPG) data via an out-of-band channel that yields a low data rate, EPG content cannot be received rapidly on-demand nor rapidly updated. The present invention, on the other hand, enables subscribers to receive and view multiple channels and associated content at will. Using the multiple-tuner DHCT of the present invention, subscribers can view multiple television stations and program content simultaneously, without degradation to television signals or pictures. According to one aspect of the invention, the DHCT may be a set-top box in communication with a television display. According to an alternative aspect of the invention, the DHCT may be housed within the television display.

Additionally, the multiple-tuner DHCT can receive data representative of EPG information, or any other type of data (e.g., Internet data), in addition to receiving audio and video channels. Therefore, the DHCT of the present invention enables a viewer to watch a plurality of television programs while simultaneously accessing and displaying EPG information on a TV Display connected to the DHCT. Similarly, a viewer can receive digital data, such as data provided by an Internet Service Provider, and can respond via the DHCT to enable an interactive television experience while continuing to watch one or more TV channels without interruption. EPG information, or an Internet interface, can be enabled with the aid of application software running on the DHCT device of the present invention.

According to one embodiment of the invention, a DHCT for enabling subscribers to simultaneously view multiple television channels on a display is disclosed. The Digital Home Communication Terminal includes an interface for receiving a plurality of transmission channels from a Digital Broadband Delivery System, a plurality of tuners for receiving the plurality of transmission channels, and in communication with the interface, wherein each tuner receives a respective transmission channel capable of carrying one or more media entities, and an output port, in communication with the plurality of tuners, for transmitting multiple media entities received by each respective tuner to the TV display. According to one aspect of the invention, at least one transmission channel includes a digital transmission channel capable of carrying one or more media entities, and at least one other transmission channel may include an analog transmission channel. Furthermore, the DHCT can include a central processing unit that requests program data from the DBDS and memory and/or storage to store program data.

According to another embodiment of the invention, a DHCT for enabling subscribers to simultaneously view multiple television channels and electronic program guide content received from a DBDS, on a display, is disclosed. The DHCT includes a plurality of tuners for receiving a plurality of transmission channels, wherein each tuner receives a respective channel of the plurality of transmission channels, wherein each transmission channel is capable of carrying one or more media entities, and an output port for transmitting each of the respective transmission channels for simultaneous viewing on the display. Furthermore, the digital home communication terminal can include a central processing unit that requests EPG data from the DBDS, and wherein the EPG data is transmitted to the display simultaneously with each of the respective transmission channels. The DHCT can further include memory and/or storage to store a database containing EPG data. Additionally, at least one transmission channel of the DHCT includes a digital transmission channel capable of carrying one or more media entities, and at least one other transmission channel may include an analog transmission channel.

According to another embodiment of the invention, a method for enabling the simultaneously viewing of multiple television channels and electronic program guide information is disclosed. The method includes receiving a plurality of transmission channels, wherein at least one transmission channel includes electronic program guide data, generating electronic program guide information from the electronic program guide data, and displaying on a display a plurality of television programs received as media entities via the plurality of transmission channels simultaneously with electronic program guide information. According to the invention, displaying the plurality of transmission channels on a display can include displaying the plurality of transmission channels, such as television programs, wherein each transmission channel has associated electronic program guide information simultaneously displayed therewith on the display.

Additionally, the method of the present invention can further include receiving a request for electronic program guide information from a subscriber and the plurality of electronic program guide information is displayed. The request for electronic program guide information can also include a request to view electronic program guide information for a plurality of media entities, such as television programs.

DETAILED DESCRIPTION

The present invention now will be described more fully hereinafter with reference to the accompanying drawings, in which exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The functions and advantages of the Digital Home Communication Terminal (DHCT) of the present invention are based upon its ability to simultaneously receive, decode and composite into a single display presentation the audio, video, graphical and textual data of multiple TV channels on a real-time basis. The DHCT of the present invention also includes the ability to scale down the spatial resolution of the motion video pictures of the TV channels for insertion into a composited presentation while maintaining the original picture rate, or a fraction thereof, of the scaled video pictures in the composite presentation. The DHCT can also maintain audio playback of a single TV channel during the composite presentation and update the composite presentation in response to viewer input, to effect an update of displayed graphical and textual EPG information while simultaneously effecting an update of the respective scaled video pictures of the corresponding TV channels as if each was an independent object on the display. The update of the displayed EPG information may also be effected with an animated scrolling effect while simultaneously effecting the update of the respective scaled video pictures with an animated scrolling effect in the same scrolling direction or in a direction orthogonal to the EPG information scroll. Additionally, the DHCT of the present invention can switch audio playback of a next channel responsive to viewer input while effecting an update to the composited presentation.

Because the functions and advantages of the multiple-tuner Digital Home Communication Terminal (DHCT) of the present invention are based upon the ability to display audio, video, graphical and textual data simultaneously, wherein one or more DHCT tuners receive all these media and data from multiple input channels, a brief summary of a Digital Broadband Delivery System (DBDS) will first be described, including the form and type of data delivered over the system to the DHCT of the present invention. Next, a DHCT according to the present invention and having a plurality of tuners to receive a plurality of data streams from one or more channels will be described. Finally, the use of the DHCT of the present invention in conjunction with Electronic Program Guide (EPG) content will be described, as well as illustrative functions made possible by the DHCT of the present invention.

Figure 1:
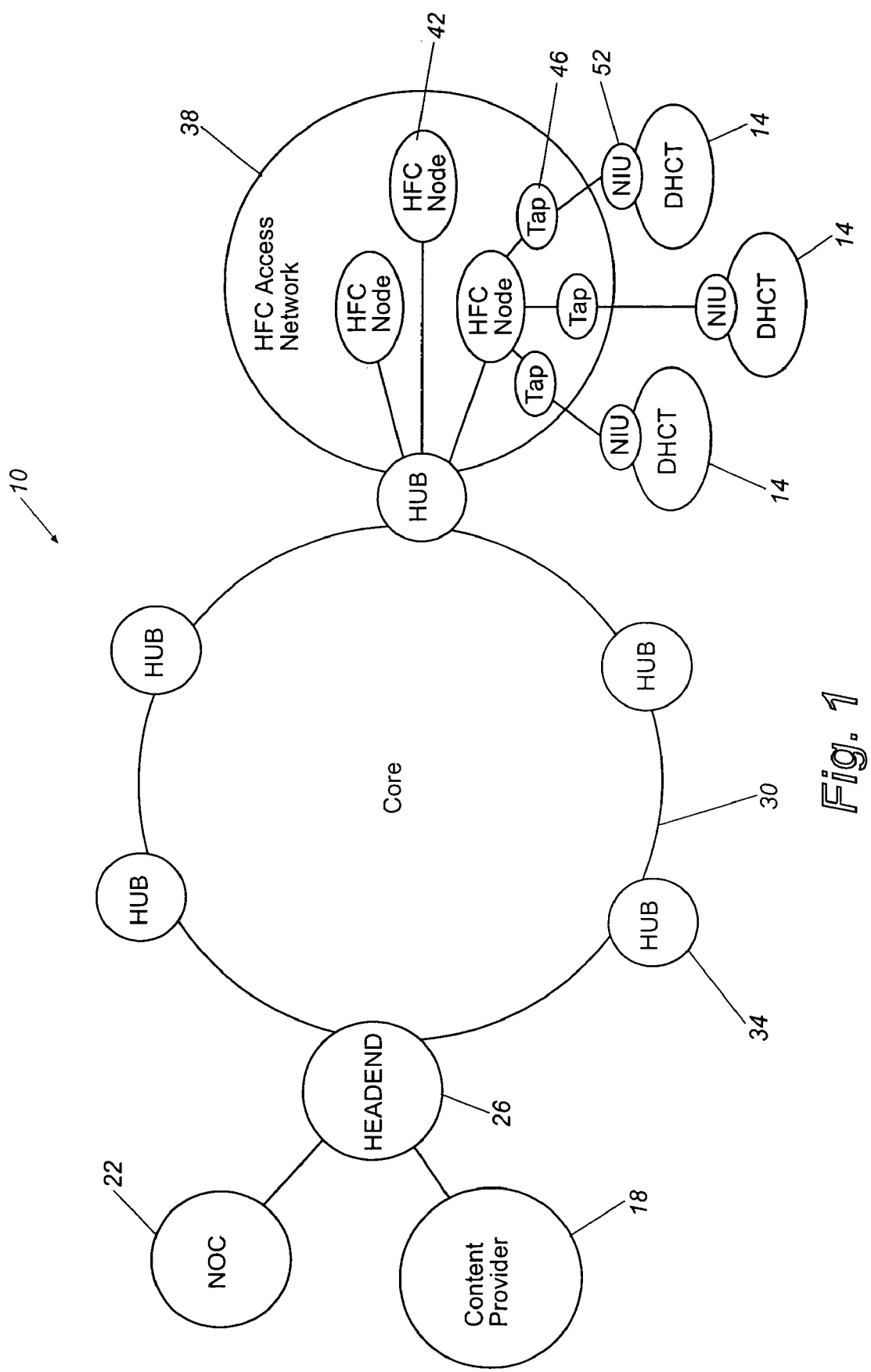
FIG. 1 shows a block diagram of a Digital Broadband Delivery System (DBDS) including a Digital Home Communication Terminal (DHCT), according to one aspect of the invention.

FIG. 1 shows a block diagram view of a Digital Broadband Delivery System (DBDS) 10, including a Digital Home Communication Terminal (DHCT) 14 of the present invention. Generally, the DBDS 10 is a high quality, reliable and integrated network system that features video, audio, voice and data services to Cable TV subscribers. Although FIG. 1 depicts a high level view of a DBDS including a regional HFC Access Network 38, as will be described below, it should be appreciated that a plurality of DBDSs can tie together a plurality of regional networks into an integrated global network so that Cable TV subscribers can receive content provided from anywhere in the world. The DBDS 10 shown in FIG. 1 delivers broadcast video signals as digitally formatted signals in addition to delivering traditional broadcast analog video signals. Furthermore, the system can support one way broadcast services as well as both one-way data services and two-way media and data services. The two-way operation of the network allows for subscriber interactivity with services, such as Pay-Per-View programming, View-on-Demand programs, and interactive applications, such as Email, Internet connections, and EPG applications.

The DBDS 10 provides the interfaces, network control, transport control, session control, and servers to access content and services, and distributes content and services to Cable TV subscribers. As shown in FIG. 1, a typical DBDS 10 is composed of interfaces to Content Providers 18, Network Operations Centers (NOC) 22, core networks 30 of headends 26, hubs 34, Hybrid Fiber/Coax (HFC) Access Networks 38, and subscribers' DHCTs 14. It should be appreciated that although single components (e.g., headend 26, core network 30, HFC Access network 38, etc.) are illustrated in FIG. 1, a DBDS 10 can feature a plurality of each of the illustrated components.

The Content Provider 18 represents one or more providers of content, such as video channels, music channels, data channels, video services, audio services and data services. For example, according to one aspect of the invention, the Content Provider 18 could comprise an Electronic Program Guide (EPG) data provider that acts as a data service provider. According to another aspect of the invention, the Content Provider 18 could represent an Internet Service Provider (ISP) providing data to the system to enable subscribers web access or web-enhanced video via the subscriber's television set. The Content Provider 18 transmits the content to a headend 26 for further transmission to subscribers downstream in the network. Also in communication with the headend 26 is a Network Operation Center (NOC) 22, which is an external management center interfaced with the DBDS 10 to allow for the remote operation of the system.

Content provided by the Content Provider 18 is communicated by the Content Provider 18 to one or more headends 26. From those headends 26 the content is then communicated to the core network 30 of hubs 34 and onto a plurality of Hybrid/Fiber Coax (HFC) Access Networks (only one HFC Access Network 38 is illustrated). The HFC Access Network 38 typically comprises a plurality of HFC nodes 42, each of which may service a local geographical area. The content provided from the Content Provider 18 is transmitted through the headend 26, hub 34 and HFC Access Network 38 downstream to one or more taps 46 from each one of the HFC nodes 42 of the HFC Access Network 38. The hub 34 connects to the HFC node 42 through the fiber portion of the HFC Access Network 38. Usually, the HFC node 42 connects to a subscriber's DHCT 14 through coaxial cable in a logical tree configuration, which is where the optical-to-electrical and electrical-to-optical conversations of the HFC network take place. From the HFC node 42 a coaxial drop connects the tap 46 to a Network Interface Units (NIU) 52, which is a network demarcation point physically located on the side of the subscribers' home. The NIU 52 provides a transparent interface between the HFC node 42 and the subscribers' internal wiring. Coaxial cables are preferred in this part of the system because the electrical signals can be easily repeated with RF amplifiers. Typically, six amplifiers or less are located in series between the HFC node 42 and the subscribers' DHCTs 14.

Figure 2:
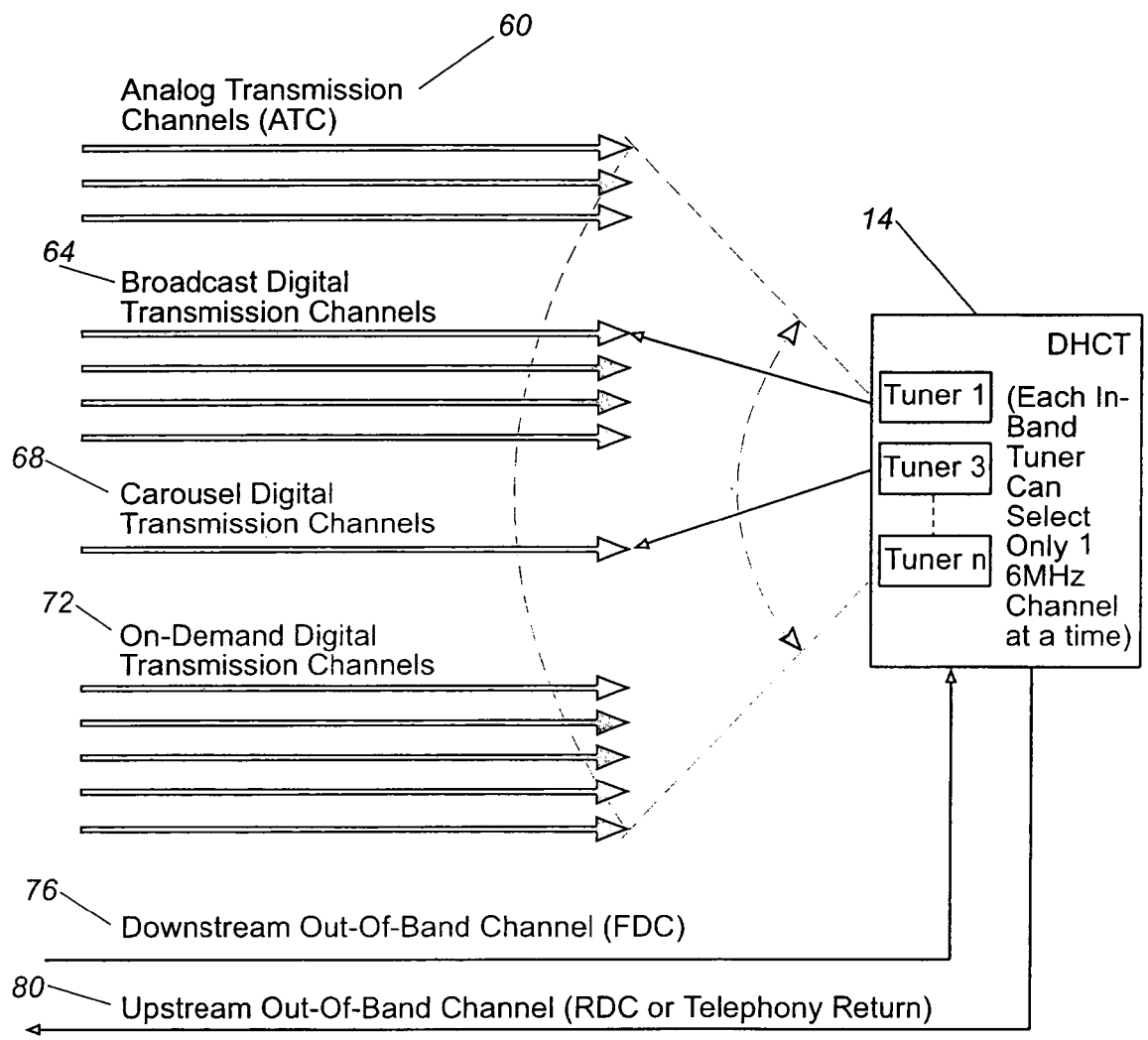
FIG. 2 shows the input channels supported by a DBDS, and input into a DHCT of the present invention, according to one aspect of the invention.

As DBDSs are well known to those of skill in the art, further description of the DBDS 10 of FIG. 1 will not be contained herein. Because the form and content provided to the multiple-tuner DCHT of the present invention by the DBDS 10 is essential to understanding the purpose, operation and function of the multiple-tuner DHCT, the data provided by the DBDS to the multiple-tuner DCHT will next be discussed with reference to FIG. 2. FIG. 2 shows illustrative channels supported by the DBDS, where the channels 60, 64, 68, 72 and 76 are input into a DHCT 14 of the present invention. These input channels can be provided by the one or more Content Providers 18 illustrated in FIG. 1. Additionally, a few channels can be generated at a Headend 26 or at a Hub 34 functioning as a mini-Headend that possesses some Headend functionality.

As depicted in FIG. 2, the DBDS 10 can simultaneously support a number of transport channel types and modulation formats. The ability to carry analog and digital signals over a large bandwidth are characteristics of a Hybrid Fiber/Coax (HFC) Network typically employed in a DBDS, as in the DBDS 10 of FIG. 1. As will be appreciated by those of skill in the art, analog and digital signals in HFC networks can be multiplexed using Frequency Division Multiplexing (FDM), which enables many different types of signals to be transmitted over the DBDS 10 to the DHCT 14 of the present invention. Typically, a DBDS using HFC supports downstream (i.e., in the direction from the Headend to the DHCT) frequencies from 50 MHz to 870 MHz, whereas upstream frequencies (i.e., in the direction from the DHCT to higher levels of the system) are in the 5 MHz to 42 MHz band. Generally, the RF channel bandwidth spacing for analog and digital services is 6 MHz. Furthermore, for a typical 870 MHz system in the U.S., a possible downstream RF spectrum subdivision plan uses 6 MHz spaced RF channels within the 50 MHz to 550 MHz band for analog video carriers and within the 550 MHz to 870 MHz range for digital carriers. It should be understood that RF channels can be assigned to carry analog video signals but the present invention is not limited to embodiments where a RF channel is assigned to carry analog video signals upon fulfillment of a complete transition of the DBDS to an all digital system.

Referring again to FIG. 2, the downstream direction channels, having been multiplexed using frequency division multiplexing (FDM), and often referred to as in-band channels, include Analog Transmission Channels (ATCs) 60 and Digital Transmission Channels (DTC) 64, 68, 72 (also known as Digital Transport Channels). These channels carry video, audio and data services. For example, these channels can carry television signals, Internet data, or any additional types of data, such as Electronic Program Guide (EPG) data. The signals and data carried on these channels are collectively referred to herein as services. The ATCs 60 shown in FIG. 2 are typically broadcast in 6 MHz channels having an analog broadcast composed of analog video and analog audio, and include Broadcast TV Systems Committee (BTSC) stereo and Secondary Audio Program (SAP) audio. Additionally, as will be appreciated by those of skill in the art, additional data, such as EPG data, can be sent with the analog video image in the Vertical Blanking Interval (VBI) of the video signal. It should be appreciated, however, that the amount of data that can be transmitted in the VBI of the analog video signal is typically significantly less than data transmitted in a DTC, as explained below.

Like the ATCs 60, the DTCs 64, 68, 72 each occupy 6 MHz of the RF spectrum. However, the DTCs 64, 68, 72 are digital channels consisting of 64- or 256-Quadrature Amplitude Modulated (QAM) digital signals formatted as MPEG-2 transport streams, allocated in a separate frequency range. As will be described in more detail below, the MPEG-2 transport stream enables transmission of a plurality of DTC channel types over each 6 MHz RF channel, as compared to a 6 MHz ATC. The three types of digital transport channels illustrated in FIG. 2 include broadcast digital transmission channels 64, carousel digital transmission channels 68, and on-demand transmission channels 72.

MPEG-2 transport may be used to multiplex video, audio, and data in each of these Digital Transmission Channels (DTCs). However, because MPEG-2 transport stream multiplex video, audio, and data to be placed into the same stream, the DTCs do not necessarily have to be allocated in separate 6 MHz RF frequencies, unlike ATCs 60. On the other hand, each DTC is capable of carrying multiple broadcast digital video programs, multiple cycling data carousels containing broadcast data, and data requested on-demand by the subscriber. Data is formatted, such as in Internet Protocol (IP), mapped into MPEG-2 packets, and inserted into the multiplexed MPEG-2 transport stream. According to one aspect of the invention, encryption can be applied to the data stream for security so that the data, such as EPG data, may be received only by authorized DHCTs. For instance, one individual subscriber may be authorized to receive minimal set of EPG data, while others may be authorized additional incremental amounts of EPG data (for example, EPG data for future days) according to a tiered service fee and/or depending on the amount of memory in the DHCT. Therefore, additional subscribers in the same local area not authorized to receive EPG data will not.

Each 6 MHz RF channel assigned as a digital transmission channel can carry the video and audio streams of the programs of multiple television (TV) stations, as well as media and data that is not necessarily related to those TV programs or TV channels, as compared to one TV channel broadcast over one ATC 60 that consumes the entire 6 MHz. The digital data is inserted into MPEG transport streams carried through each 6 MHz channel assigned for digital transmission, and then de-multiplexed at the subscribers' DHCT so that multiple sets of data can be produced within each tuned 6 MHz frequency span.

Continuing with FIG. 2, the broadcast DTCs 64 and carousel DTCs 68 typically function as continuous feeds for indefinite time, whereas the on-demand DTCs 72 are continuous feeds sessions for a limited time. All DTC types are capable of being transmitted at high data rates. The broadcast DTCs 64 carry typical data comprising multiple digitally-MPEG-2 compressed and formatted TV channels and other continuously fed data information. The carousel DTCs 68 carry broadcast data, such as EPG data, that is systematically broadcast in a cycling fashion but updated and revised as need be. Thus, the carousel DTCs 68 can serve to carry high volume data, such as EPG data, as well as other data at high data rates. The carousel DTCs 68 typically carry data formatted in directories and files by a Broadcast File System (BFS), which is used for producing and transmitting data streams throughout the DBDS, and which provides an efficient means for the delivery of application executables and application data to the DHCT, as disclosed by co-pending application Ser. No. 09/319,844, entitled "Using a Hierarchical File System For Indexing Data Broadcast to a Client From a Network of Servers", filed Dec. 9, 1997, assigned to Scientific-Atlanta, Inc., and incorporated herein by reference. The on-demand DTCs 72, on the other hand, can carry particular information such as compressed video and audio pertaining to subscriber requested program preview and/or program descriptions, as well as other specialized data information. Although broadcast in nature, the carousel DTCs 68 and on-demand DTCs 72 offer different functionality. The User-to-Network Download Protocol of the MPEG-2 standard's DSM-CC specification (Digital Storage Media—Command and Control) provides the data carousel protocol used for broadcasting data from a server located at headend 26. It also provides the interactive download protocol for reliable downloading of data from a server (possibly the same server) to an individual DHCT through the on-demand DTCs. Each carousel and on-demand DTC is defined by a DSM-CC session.

Also shown in FIG. 2 is an Out-Of-Band (OOB) channel that provides a continuously available two-way signaling path to the subscribers' DHCT 14 regardless of which in-band channels are tuned to by the individual DHCT in-band tuners. The OOB channel consists of a Forward Data Channel (FDC) 76 and a Reverse Data Channel (RDC)

80. The OOB channel can comply to any one of a number of well known transport protocols but preferably complies to either a DAVIC 1.1 Transport Protocol with a FDC of 1.544 Mbps or more using QPSK modulation and an RDC of 1.544 Mbps or more using QPSK modulation, or to a DOCSIS Transport Protocol with a FDC of 27 Mbps using 64-QAM modulation and a RDC of 1.544 Mbps or more using QPSK modulation or 16-QAM modulation. The OOB channels provide the two-way operation of the network, which allows a subscriber interactivity with the applications and services provided by the network. Therefore, functionality reflected in the DHCT 14 is similar to a networked computer (i.e., a computer without a persistent storage device), in addition to traditional set top box functionality, as is well known in the art. Furthermore, the OOB channels are not limited to a 6 MHz spectrum, but generally to a smaller spectrum, such as 1.5 or 3 MHz.

The DHCT 14, as will be described in detail with reference to FIGS. 3 and 4, comprises a plurality of tuners that each receive one of the transmission channels at any given time. Using multiple tuners enables the DHCT 14 of the present invention to tune to a plurality of downstream services, thereby allowing a subscriber to tune simultaneously to multiple services, including television channels and other media content, transmitted in the downstream via the DBDS, an advantage over conventional DHCTs. Because conventional DHCTs contain only one in-band tuner that can tune to one frequency at a time, conventional DHCTs are limited to receiving data from one frequency, resulting in the inability to unconditionally display multiple channels and content (such as EPG content) simultaneously. The present invention, on the other hand, enables subscribers to view multiple channels or other media content at will, along with their respective EPG data, all simultaneously in one presentation displayed on a display (e.g., a television) connected to the DHCT. Using the multiple-tuner DHCT of the present invention, subscribers can view multiple services simultaneously, without degradation to television signals or pictures, and without experiencing disruption of the multiple TV channels being watched.

Whereas a two-tuner DHCT may provide conventional DHCT functionality through a dedicated tuner for that purpose, and cable modem functionality through a second tuner dedicated to receive internet data to be routed to a computer or PC externally connected to the DHCT via a network port such as an Ethernet or USB port, the present invention employs multiple tuners to receive services to be processed within the DHCT and viewed through a TV display connected to the DHCT via a DHCT output port. Furthermore, the DHCT of the present invention contains additional capabilities to simultaneously decompress and reconstruct the video, audio, graphics and textual data of multiple digital and analog TV programs, to store those video pictures and audio in memory in real-time, to scale down the spatial resolution of those video pictures in real-time, and to composite and display a Graphical User Interface (GUI) presentation of the multiple scaled down video pictures with their respective EPG data in real-time while simultaneously playing back the audio corresponding to one of the scaled down video pictures. The display of the scaled down video picture corresponding to the audio being played is differentiated in the presentation, for instance, by being highlighted or outlined in a different color, to provide the associative perception to the user of the program currently in focus with respect to the user's attention. One such differentiation method is to employ an encapsulation of each scaled down picture with graphical beveled edges so the displayed presentation gives a perception of an indentation (or alternatively a protrusion) to the picture in focus. Alternatively, the periphery of the scaled down pictures, other than the one in focus, is darkened or grayed-out relative to the one in focus.

Figure 3:
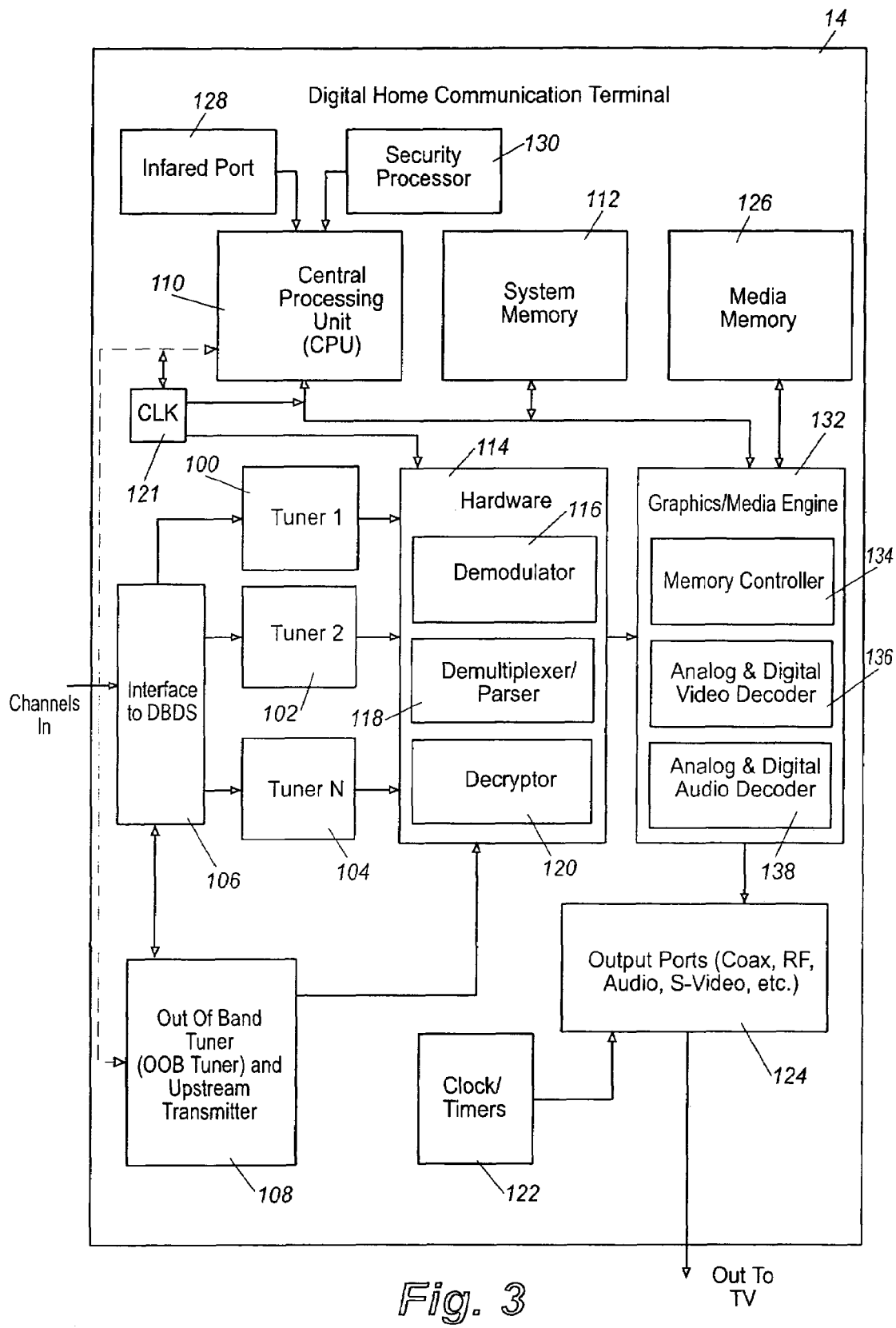
FIG. 3 is a block diagram of the components comprising the DHCT of FIG. 2, according to one aspect of the present invention.
Figure 4:
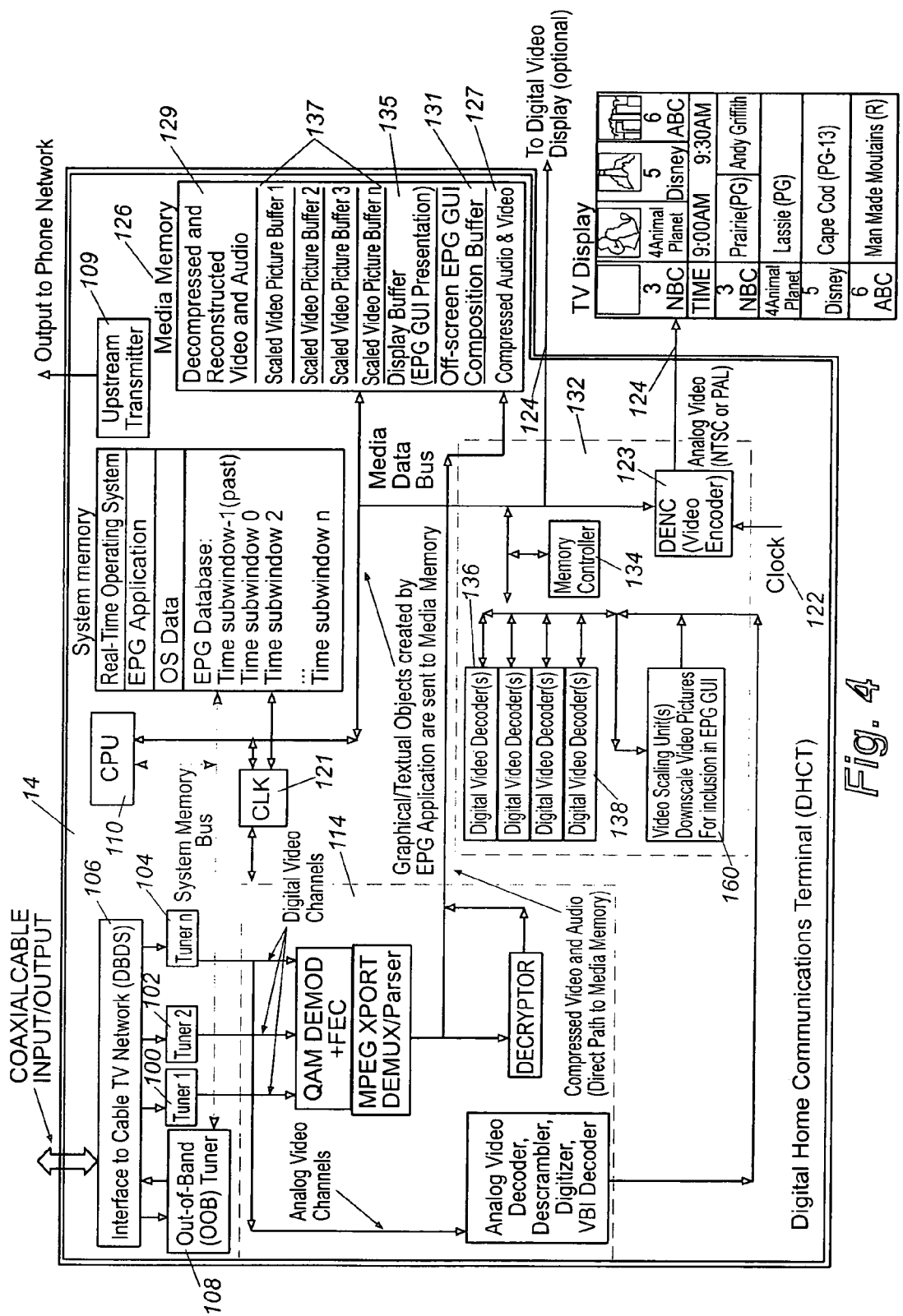
FIG. 4 is a block diagram of the components comprising the DHCT of FIG. 2, according to another aspect of the present invention.

FIGS. 3 and 4 are block diagrams of components that are included in the DHCT 14 of the present invention, according to two aspects of the present invention. As illustrated in the figures, the DHCT 14 of the present invention includes an interface to the DBDS 106 through which the DHCT 14 receives data from a plurality of analog or digital channels, including analog and digital broadcast TV programs and data, collectively, services, including video, audio and data channels such as DOCSIS cable modem channels. More specifically, because each tuner 100, 102, 104 of the DHCT 114 can select only one in-band channel at a time, a plurality of tuners are provided so that multiple channels transmitting services can be received simultaneously using the DHCT of the present invention. Although the DHCT 14 may be implemented using two in-band tuners 100, 102, it may be advantageous to use multiple tuners where a large number of channels are to be displayed simultaneously. Preferably, the tuners 100, 102, 104 are capable of receiving signals from an HFC Plant (e.g., an 870 MHz HFC Plant), and each is capable of analog and digital (64/256 QAM) tuning to a single RF channel from a multiplicity of spaced RF channels (e.g., 6 MHz spaced RF channels in the US, 8 MHz in Europe).

Also included within the DHCT 14 is an Out-of-Band (OOB) tuner and upstream transmitter 108 that is connected to the interface to the DBDS 106. The OOB tuner and upstream transmitter 108 enable the DHCT 14 to interface with a DBDS network so that the DHCT 14 can provide upstream data to the network, for example, via a QPSK channel or a QAM channel. In this manner, a subscriber can interact with the DBDS to request services, such as Pay-Per-View programming and View-On-Demand programs and/or comprehensive EPG data for desired programs. It should be appreciated that although the OOB tuner and upstream transmitter are illustrated as one component in FIG. 3, the tuner and transmitter can be independent of each other and located separately within the DHCT 14, as in FIG. 4, where an OOB 108 and upstream transmitter 109 are separate components of the DHCT 14. Nonetheless, both components must be in communication with the DBDS so that upstream transmissions can be received by the system. According to one aspect of the invention, a telephone modem in the DHCT 14 can be utilized for upstream data transmission and a headend 26, hub 34 or other component located upstream in the DBDS can receive data from a telephone network in communication with the telephone modem, where the telephone network routes the upstream data to a destination internal or external to the DBDS, such as a Content Provider.

Referring again to the DHCT 14 shown in FIG. 3 and FIG. 4, after the one or more tuners 100, 102, 104 select one or more transmission channels, incoming data is forwarded to hardware 114 comprising circuitry with capability for demodulating 116, demultiplexing and parsing 118, and decrypting 120 the incoming signals. More specifically, the hardware components 114 are capable of QAM demodulation, Forward Error Correction (FEC), parsing MPEG-2 transport streams, packetized elementary streams, and elementary streams, and decryption, as is well known in the art, to counter the effect of signal processing of broadcast media and data in the DBDS. Particularly, such signal processing is performed at the headend 26 and in some cases it may be performed in part at the hubs 34. As shown in FIG. 4, received compressed video streams and audio streams can be deposited continuously into the Compressed Audio and Video Buffers of Media Memory 126. Although not illustrated in the embodiment of FIG. 3, additional components can be included within the hardware 114, such as descramblers, decoders, digitizers (see FIG. 4), signal amplifiers, and other circuitry for signal or error recovery.

One primary component of the DHCT 14 is the CPU 110, which controls the functions of the DHCT 14 via a real-time, multi-threaded operating system that enables task scheduling and switching capabilities. More specifically, the CPU 110 operates to control specialized functions of the DHCT 14 enabled by the DHCT's ability to receive a variety of content, such as EPG data, in addition to analog and digital television signals or other media services. For example, according to one aspect of the invention, the CPU 110 executes instructions of application software, such as an EPG Application in System Memory 112, residing in the System Memory 112 to receive, decode (if compressed) and interpret EPG data received via one or more tuners 100, 102, 104, 108. In this example, the DHCT 14 can receive via one or more of its tuners 100, 102, 108 EPG data that originated from one or more EPG Data Providers (i.e., a Content Provider 18) coalesced and stored in an EPG Server (not illustrated) at the headend 26 for transmission to DHCTs throughout the DBDS network, or to only those DHCTs authorized to receive EPG Data. It should be appreciated, however, that prior to transmitting EPG data to the DHCT 14, an EPG Server likely performs various operations on the EPG data. For instance, the EPG Server may format the EPG data into a format interpretable by the EPG Application running in the DHCT 14 and feed the data into carousel and on-demand DTCs 68, 72 originating at the headend 26 for downstream transmission through the DBDS 10 to DHCTs 14.

The EPG Application is a programmed software application executed by utilizing the computer resources in the DHCT 14. The EPG Application is an executable program stored in System Memory 112 and executed by CPU 110 (or a digital signal processor) under the auspices of the Real-Time Operating System, and System Memory 112. Data required as input by the EPG Application is stored in System Memory 112 and read by CPU 110 from System Memory 112 as need be during the course of EPG Application program execution.

Input data may be data stored in System Memory 112 by a secondary application or other source, either internal or external to the DHCT, or possibly anticipated by the EPG Application and thus created at the time the EPG Application was generated as a software application program. Data may be received via any of the communication ports of the DHCT 14, from any components in the headend 26 (including can EPG Server), via the DHCT's DBDS interface 106 (i.e., the in-band QAM tuners 100, 102, 104 or an out-of-band tuner 108) or as subscriber input via a communication interface such the infrared port 128. Data generated by the EPG Application is stored in System Memory 112 by CPU 110 during the course of EPG Application execution. Availability, location and amount of data generated by a first application for consumption by a secondary application of the EPG Application is communicated by messages as described below. Messages are communicated through the services of the operating system, such as interrupt or polling mechanisms or data sharing mechanisms such as semaphores.

According to one embodiment of the invention, a Navigator, also a programmed software application, resides in the DHCT 14 and provides a set of core functionality and selectable services to the subscriber. Although not illustrated in FIGS. 3 and 4, the Navigator Application can be stored within the System Memory 112 and executed by the CPU. The Navigator's core functionality can include volume and configuration settings as will be described in detail below. Within the Navigator is a Configuration Manager comprising software, hardware, or a combination thereof, which allows a subscriber to select the number of TV stations to view simultaneously on a single displayed EPG Presentation, channel line-up display order within such EPG presentation, scrolling characteristics, location of the channel in focus within the EPG presentation, and other configurable aspects of the EPG presentation described herein. A subscriber can customize the view of the EPG presentation to be employed by first entering an interactive configuration session that results in his/her preferences selection and storing such preferences as data in System Memory 112. Once a subscriber sets EPG display preferences via an interactive configuration session, all future EPG presentation sessions will conform with the subscriber's saved preferences. Saved preferences are input data to the EPG Application. Additional preference selection can include a preferred way or a prioritized order of preferences in which DHCT 14 is to receive EPG data from DBDS. The subscriber can select from a multiplicity of methods in which to receive EPG data during the interactive configuration session. To facilitate subscriber input of preferences the interactive configuration session can display questions and potential consequences to the subscriber for each of the alternate methods for receiving EPG data.

The Navigator can also include a Service Application Manager (SAM) as described in patent application Ser. No. 09/025,577, filed Feb. 18, 1998 by DeFreese et al., entitled "System And Method For Providing A Full Service Television System", incorporated herein by reference, and a Window Manager. These can also be executable programs stored within System Memory and executed by the CPU, or may additionally or alternatively comprise hardware. The SAM may maintain a services database of all services available on the DHCT that the subscriber may access, and can invoke an application responsive to user input. For instance, the SAM can initiate a message to the EPG Application when a subscriber presses a "GUIDE" key on a DHCT remote device to activate the EPG Application. The SAM may also provision for invoking a second function in response to a first function's request to launch the second function. Hence, it is possible through an Application Programming Interface (API) for any application in the DHCT 14, including the Navigator, to request the EPG Application to launch, to request services from the EPG Application, and to access EPG data.

The Window Manager can abstract the display of independent objects during an EPG presentation containing multiple scaled down video pictures and corresponding EPG program information, or picture-in-picture functionality as described elsewhere herein. Window Manager functionality includes maintenance of a user input registry so that when a user enters a key or a command via the remote device received through infrared port 128 or another input device such as a keyboard or mouse, the user input registry is accessed to determine which of various applications running on the DHCT should receive the inputted key. Therefore, the Window Manager can route data to the EPG Application, which results in the EPG Application executing accordingly.

For instance, input data can cause the EPG to scroll through the channel line-up as described herein.

According to the present invention, the CPU 110 executes commands or instructions provided by the programmed software applications, such as the EPG Application, stored in the system memory 112. As stated above, the CPU 110 may be directed to execute the EPG application by a viewer when the viewer presses keys of an remote control, such as an infrared or UHF remote control, associated with the DHCT 14. Infrared or UHF signals are received through a port 128 in the DHCT 14. For instance, where a viewer requests EPG content, the EPG application executing on CPU 110 can cause CPU 110 to generate a request message for EPG Data. This request can be transmitted via the OOB tuner and upstream transmitter 108 through the RDC 80, possibly specifying one or more channels in which EPG Data is to be or not be transmitted to DHCT 14 as to not disrupt the viewer from continuing to view the currently tuned channels. Upon specification by the EPG Application executing in the DHCT 14, the EPG Server can transmit a message to the DBDS 14 through the FDC 76 to request data, including, for example, the start time and length of a transmitted service such as a television channel. This requested data can be inserted into one or more DTCs, such as an on-demand DTC received by the OOB tuner 108. As stated above, the OOB tuner 108 may specify one or more on demand DTCs to be used for receiving the requested information. Alternatively, the requested data can be inserted in a carousel DTC 68. The DHCT 14 can then use a non-employed tuner to tune to the 6 MHz RF channel in which the specified on-demand or carousel channel is to be found. Alternatively, if the requested data is transmitted via multiple DTCs, the EPG server's message specification can contain different attributes such as data rate for the alternate channels, and the DHCT's CPU 110 can interpret the message specification and tune to the 6 MHz RF channel that is most convenient to receive the requested data.

According to another aspect of the invention, the requested EPG data generated by the EPG application in the DHCT 14 in response to viewer input can include one or more of the currently tuned channels as the desired channels for which the requested data is to be transmitted. Hence, the DHCT 14 does not have to disengage any of its currently tuned channels and wait for the requested data to be inserted into the multiplexed MPEG-2 transport stream of one of its tuned 6 MHz RF channels. Requested EPG data may also be received through the FDC 76, especially when a minimal amount of data is requested. Hence, the DHCT 14 provides superior benefits over conventional tuners when the DHCT 14 is connected to a two-way network. According to the EPG Application, the CPU 110 interprets EPG Data received via one of multiple tuners 100, 102, 104, stores the data in the system memory 112, and processes and displays the requested data to the viewer. Additionally, where a large amount of EPG data is requested by a viewer, the EPG data could be stored in an optional local storage (magnetic or optical) device (e.g., connected through a SCSI-II or IDE interface as an internal or external disk drive) as an alternative to storage in system memory 112. After storing the EPG data, the EPG Application can decode and interpret the EPG data so that requisite EPG data can be retrieved based upon a future viewer request for EPG information.

According to one aspect of the invention, the EPG data or subsets thereof are transmitted through a multiplicity of in-band channels. That is, instances of the same EPG database information are transmitted, although redundant and at the expense of channel bandwidth consumption, to enable the DHCT 14 to have a multiplicity of options in which to receive the EPG data. Therefore, because of this redundancy, the likelihood of disrupting the presentation of any of the TV programs being displayed on the TV Display is reduced.

Additional functions with respect to the EPG Application's execution in the DHCT 14 include: receiving attributes associated with programs in EPG and storing those attributes in the system memory 112, receiving and interpreting both the version number of an EPG Data set and associated status information, as provided within EPG Data or a subset thereof, discarding obsolete EPG Data, updating changed EPG Data, updating a subset of EPG Data periodically or upon notification by the EPG Server located at the headend 26, and, depending on state of displayed information and state of employment of each in-band tuner, effecting the selection of the most appropriate channel to receive an EPG Data set, or a subset thereof, from a multiplicity of alternatives. Each of these functions will be appreciated with respect to the illustrative embodiment of the EPG application of a DHCT, according to one aspect of the present invention, discussed in detail below.

Also included within the DHCT 14 is a Graphics/Media Engine 132 that further processes signals for output via output ports 124 to a television set or display. The output ports 124 preferably comprise a RF Channel 3 and 4 output to drive an analog TV or Display or other device such as a VCR, as well as an output video port to drive a display, monitor or TV set that receives an analog TV signal at its input. Additionally, it should be appreciated that the TV or display may be connected to the DHCT 14 via a video port such as Composite Video, S-Video, or Component Video. The output ports 124 can also comprise Digital Component Video or an IEEE-1394 interface to drive a TV or Display that receives non-compressed digital TV signals at its input. The Graphics/Media Engine 132 includes components for analog and digital video decoding, as well as analog and digital audio decoding, as are well known in the art. As shown in FIGS. 3 and 4, components of the DHCT 14 include an analog descrambler and analog video decoder with capability for analog video or audio descrambling, and a security processor 130 working in conjunction with a decryptor 120 to decrypt encrypted digital video, audio or data, as is well known to those of skill in the art. The security processor 130 functions to authorize paying subscribers' DHCTs to execute specialized features of the DHCT 14, such as executing the EPG software application and receiving EPG Data.

The DHCT 14 also includes a Memory Controller 134 and a Media Memory 126. These components can include software and hardware to compose and store graphical information created by the CPU 110. These components enable the compositing of graphical data (e.g., EPG content) with video into a picture for a TV display as provided by capabilities in Graphics/Media Engine 132. Such compositions include graphics data overlayed on video, or downscaled video overlayed onto graphics, or a composition of non-overlapping downscaled motion video pictures and graphic partitions of display. As facilitated by chroma keying and alpha-blending capabilities with an alpha-blend plane, as is well known in the art, such compositions also include graphics data blended on video (video ghost in background), or video blended onto graphics (graphics as ghost). Furthermore, each partition can possibly be of different geometrical shape (e.g., rectangle, circle, ellipse) as facilitated by the chroma keying capabilities in the Graphics/Media Engine 132. Alternatively, decoded EPG data can be presented for display as a graphical presentation simultaneously with the spatially scaled-down moving picture of one on-time program or moving pictures corresponding to multiple current programs wherein each picture is spatially scaled down, although not necessarily to same resolution. Additionally, EPG data may be displayed simultaneously with moving pictures of one or more current programs and the still picture of one or more future programs, each picture spatially scaled down, although not necessarily to the same resolution. These will be more fully understood with reference to FIGS. 5A-5E, discussed below.

Next, a description of the related functions of the Graphics/Media Engine 132, system memory 112, CPU 110 and Media Memory 126 will be described with reference to FIG. 4, according to one aspect of the invention. First, compressed video and audio streams received through the in-band tuners are deposited continuously into a compressed audio and video section 127 of the Media Memory 126. Thereafter, as shown in FIG. 4, one or more video decoders 136 in the DHCT 14, and more specifically, within the Graphics/Media Engine 132, decompress compressed MPEG-2 Main Profile/Main Level video streams read into the video decoders 136 from the Media Memory's compressed video buffer 127. Each picture decompressed by the video decoders 136 is written to a picture buffer 129 in the Media Memory 126, where the reconstructed pictures are retained. Alternatively, the pictures may be decompressed in the video decoder 136, then scaled down as they are being reconstructed in a procedural fashion, by feeding data of the reconstructed pictures in raster-scan order from the video decoder 136 to the video scaling unit 160. According to this alternative, the scaled down reconstructed picture can be stored in one of multiple scaled video picture buffers 137 in Media Memory 126 in raster-scan order as they are reconstructed, such that a respective scaled video picture buffer 137 is dedicated to the motion video picture of a program included in the displayed presentation. Additionally, one or more Digital Audio Decoders 138 in the DHCT 14 can decode the compressed digital audio streams associated with the compressed digital video in a similar fashion, allocating respective buffers as necessary. It should be appreciated that in some implementations only one audio buffer may be required. As stated above, the present invention enables the simultaneous display of multiple video pictures with their respective program guide information, where the program guide information consists of graphical and textual objects. Graphical and textual objects are displayed, for instance, via EPG Application invocation of a standard library of graphics or objects as is well known in the art, which may be provided by the operating system and corresponding circuitry in the DHCT, as directed by applications executing in the CPU 110, such as the EPG Application. Once created and stored in System Memory 112, the graphical and textual objects are transferred by CPU 110 from System Memory 112 to the Media Memory 126, either to the Off-screen Composition Buffer 131 or, in another aspect of the invention, directly to the Display Buffer 135. Alternatively, the graphical and textual objects are rendered directly in the Display Buffer 135. According to one aspect of the invention, the System Memory 112 and Media Memory 126 may be unified as one physical memory device.

Continuing with FIG. 4, one or more Video Scaling Units effectuate resizing of video pictures and storage to Media Memory 126. A reconstructed digital video picture is read from the Media Memory 126 and fed into a Video Scaling Unit 160 to accomplish the scaling of the video. The scaled video is then stored in a Scaled Video Picture Buffer 137 in Media Memory 126. The Scaled Video Picture Buffer 137 in the Media Memory 126 is updated at the video picture rate or a fraction thereof for display as part of the EPG presentation at designated spatial locations. The scaled down video pictures are not required to be transferred to the Display Buffer 135 section of Media Memory 126 since it would result in unnecessary data transfers and thus waste of bandwidth in the Media Data Bus in FIG. 4. The respective scaled down video pictures become part of the composited EPG presentation by the composition capabilities of the Graphics Media Engine 132 wherein sections in the Display Buffer 135 that correspond to the rectangular areas of the scaled down video pictures are interpreted as transparent because they are filled a priori by the EPG Application with a chroma-key value signifying transparency. Therefore, the procedural display operation that results in the mixture of spatially-corresponding video picture data with the Display Buffer's graphical data is not enacted. This results in the display of pure video in those sections of the Display Buffer 135 that contain chroma key values signifying transparency.

Alternatively, as aforementioned, the pictures may be routed through one of multiple video scaling units as they are decompressed and reconstructed by the Digital Video Decoder 136. The pictures are then stored into one of multiple scaled video picture buffers in Media Memory 126. According to one aspect of the invention, each video decoder 136 can be assigned to decompress a respective compressed video stream, and respective video scaling units may also be assigned.

A Digital Video Encoder (DENC) 123 located in the DHCT 14 can convert reconstructed video data received at its input to an analog video signal driving a connected TV Display. Data is fed to the DENC 123 from Media Memory 126 in a manner to produce a raster scan of displayed pixels consistent with the Display type connected to the DHCT 14. For an NTSC Display, the DENC 123 can receive the equivalent of 30 pictures per second, each picture of spatial resolution equal to 720×480 pixels, each pixel an average data entity of 1.5 bytes.

It should be appreciated that the Media Memory 126 is a memory of finite number of bytes, and it serves as a repository for different data components. Compressed MPEG-2 video streams are deposited in a section of Media Memory 126 allocated for compressed video. Likewise, compressed digital audio streams are deposited in a section of Media Memory 126 allocated for compressed audio. The Digital Audio Decoder 138 stores decompressed audio in a similar section of Media Memory 126 dedicated to store reconstructed audio. Decompressed audio is fed into an Audio port (not shown) for playback.

As previously stated, a Display Buffer 135 within the Media Memory 126 serves as a repository for graphical and textual objects produced by the CPU, and respective Scaled Video Picture Buffers 137 are employed to store downscaled digital or analog video pictures. The content of the Display Buffer 135 is interpreted according to one or more chroma key values. The chroma key value determines whether a picture element, or pixel, is transparent or not. A transparent pixel is one that has no contribution from the Display Buffer 135 and thus results in a displayed pixel with pure contribution from a video picture. A non-transparent pixel may be translucent in accordance with spatially corresponding information to the Display Buffer 135 that is stored in an Alpha Plane. A value in the Alpha-Blend Plane indicates whether a graphical pixel in the Display Buffer 135 is opaque or a translucent mixture of graphics and video picture according to the alpha value. In one display mode, a single alpha value is specified for all pixels in Display Buffer 135 that are designated as translucent in the Alpha Plane. In another display mode, the Alpha Plane includes enough bits per pixel in the Display Buffer 135 to designate the alpha blend value on a per-pixel basis. In feeding the DENC 123 from Media Memory 126, the data is read from the Display Buffer 135 or from one of the Scaled Video Picture Buffers 137 according to information retained in the Display Buffer 135. Alternatively, the Scaled Video Picture Buffers 137 may be considered as part of the Display Buffer 135. The downscaled video pictures produced by the Video Scaling Unit 160 are stored in respective rectangular regions in the Display Buffer 135.

A Memory Controller 134 in the DHCT 14 grants access to transfer data from System Memory 112 to the Display Buffer 135 in Media Memory 126 in a timely way that safeguards from the generation of tear artifacts, as are known in the art, on the TV Display. Data transfer is granted to locations in the Display Buffer 135 corresponding to locations already passed by the raster-scan ordered data fed from Display Buffer 135 into the DENC 123. Thus, data written to the Display Buffer 135 is always behind (in raster-scan order) the Display Buffer 135 locations read and fed into the DENC 122. Alternatively, data can be written to a secondary Display Buffer 135, also called an Off-Screen or Composition Buffer 131. The Off-Screen Buffer 131, or parts thereof, are then transferred to the Display Buffer 135 by effecting a Media Memory 126 to Media Memory 126 data transfer during suitable times (e.g., during the vertical blanking video interval). The Off-Screen Buffer 131 and Display Buffer 135 can be alternated in meaning under program control upon completion of writing all objects into the Off-Screen Buffer. The Memory Controller 134 uses a Pointer that points to the beginning of the Display Buffer 135 and another Pointer that points to the beginning of the Off-Screen Buffer 131. Both Pointers are stored in either Memory or special registers internal to the Memory Controller 134. Therefore, to effectuate alternating the meaning of the Display Buffer and the Off-Screen Buffer, the content of the two Pointer repositories are swapped.

The insertion of downscaled digital video pictures into the Display Buffer 135 is typically referred to as captured video. The downscaled digital video pictures originate in Media Memory 126 as decompressed, reconstructed MPEG-2 video pictures, produced by the Video Decoder 136 or as digitized analog video pictures by an Analog Video Decoder unit. The pictures are downscaled by reading them from Media Memory 126 into the Video Scaling Unit 160, which downscales the pictures, after which they are stored in the Scaled Video Picture Buffer 137. The downscaled video picture is transferred into the Display Buffer 135 by the DHCT 14 circuitry such as a Memory Controller 134. Under synchronized video timing and employment of internal FIFOs (First-In-First-Out memory), the reconstructed MPEG-2 video picture or analog picture is read from the Media Memory 126 in raster scan order, and fed into the Video Scaling Unit to effectuate downscaling. The downscaled picture data is then stored in a designated Scaled Video Picture Buffer 137 in Media Memory 126, which can be part of the Display Buffer 135.

In an alternate embodiment, the reconstructed pictures stored in the Media Memory 126 are downscaled on transit to the DENC 122, read from Media Memory 126, downscaled by the Video Scaling Unit 160, and transferred from local memory in the Video Scaling Unit 160 to the DENC 123. The decoded picture ready to be displayed at its designated presentation time is read from Media Memory 126, one line at a time into a Horizontal Picture Scaling Circuit (HPSC) in the Video Scaling Unit 160, and output into the DENC 123 according to the timing of the video clock driving the DENC 123. Vertical scaling is conveniently implemented by neglecting to read and display video picture lines to reduce the required Media Memory Bus Bandwidth. Alternatively, a Vertical Picture Scaling Circuit (VPSC) with memory in the Video Scaling Unit 160, memory sufficient to store a few picture lines, is connected to the output of the HPSC to perform vertical picture scaling.

The decoded picture is read out of Media Memory 126 in synchronized timing to Video's Horizontal sync signal while simultaneously specifying a transparent pixel value at each pixel location of the Display Buffer 135 corresponding to the rectangular window consumed by the downscaled video picture. Hence, a transparent rectangular window (chroma key equals transparency) is stored and positioned in the Display Buffer 135 such that it coincides with the 2-D spatial size and location, respectively, of the positioned downscaled video picture fed into the DENC 123. This is done for each downscaled video picture. Elsewhere in the Display Buffer 135, all pixel locations represent opaque values according to the graphical and textual objects corresponding to EPG information.

Therefore, it should be appreciated that multiple television channels may be simultaneously viewed using the DHCT of the present invention, which includes the use of multiple tuners, each of which receives a respective transmitted signal. Furthermore, it should be appreciated that additional content, specifically EPG data, can likewise be received by one or more of the multiple tuners and viewed by a subscriber at the same time the subscriber is viewing multiple television channels.

EPG Method and Apparatus

A. EPG Application Summary

According to one aspect of the present invention, the multiple-tuner DHCT can receive data representative of EPG information in addition to receiving audio and video channels corresponding to one or more television channels. The EPG information and audio and video channels may be collectively referred to as services, as noted above. Because the DHCT can receive these channels simultaneously, the DHCT of the present invention enables a viewer to watch a plurality of television programs while simultaneously accessing and displaying respective TV programs' EPG information. The EPG information may be viewed by the subscriber with the aid of an EPG application that runs on the DHCT device of the present invention.

It should be appreciated that although the DHCT of the present invention is described herein as enabling subscribers access to EPG information, the present invention can also be utilized to enable any type of interactive application. Because the DHCT uses multiple tuners and allows for communications in both the downstream and upstream paths, the applications of the DHCT device are quite expansive, and can include any communications facilitated by a network connection. For example, software could be installed on the DHCT device of the present invention to enable an interactive Internet interface to subscribers through their televisions. Therefore, the description of the invention in terms of the EPG application is not intended to limit the scope of the invention. As will be appreciated by those of skill in the art, the DHCT of the present invention can be utilized in a wide variety of network applications.

According to one aspect of the invention, a subscriber's DHCT 14 can serve as a device to run and control an EPG application as well as an interface to access the network. Via multiple tuners 100, 102, 104, 108 that interface the DHCT to the DBDS Network 10, the DHCT 14 can receive EPG Data intended to reside in the DHCT's system memory 112. This may result from a subscriber-generated on-demand data request for EPG data, wherein specific EPG Data stored in an EPG Server at the Headend 26 of the DBDS can be retrieved. Under the auspices of a real-time operating system, executing on the CPU 110 in the DHCT 14 and capable of task scheduling and switching, the novel EPG Application described herein has a data gathering mechanism running continuously as a background task to receive EPG Data intended to reside in the DHCT's system memory 112. This EPG data gathering mechanism, hereinafter referred to as daemon task, receives EPG Data corresponding to a time-window and stores such EPG Data for a pre-specified period of time in the DHCT's system memory 112. This mechanism can be employed at power-up and/or during periodic updates that for instance occur at predetermined times (such as midnight) or upon change to the data on the EPG server and subsequent notification of the client that new data is available.

As the DHCT 14 has an internal clock and timers 121, transmission of data packets containing a time specification from the Headend enables the DHCT 14 to synchronize its clock and keep track of time and intervals of time. According to one aspect of the invention, the timers 121 can count down to a time that initiates the CPU 110 to signal the daemon task to wake up to retrieve transmitted EPG Data. The daemon task of the EPG Application has a number of novel methods in which to receive EPG Data as described above and in detail below. The subscriber benefits from EPG Data displayed on the TV (or Display) connected to the DHCT while simultaneously viewing the motion pictures of multiple TV channel without or minimal latency or program picture interruption. In contrast, a traditional EPG running in a single in-band tuner DHCT imposes latencies, picture interruption and/or channel-glitch annoyances on the viewer if it were to display unconditionally a simultaneous presentation of multiple video channels with their respective EPG Data retrieved via the in-band tuner. These annoyances result from having to temporarily use the in-band tuner to tune to a different frequency to obtain EPG Data or a program picture.

Whereas a conventional DHCT with one in-band tuner could possibly receive multiple TV channels over one digital transmission channel, it could not continue to display multiple TV programs unconditionally as in the case when the desired video pictures of the TV programs to include in the EPG presentation are transmitted over different 6 MHz RF channels. And when tuned to an analog transmission channel, a conventional tuner could only present one video picture. Furthermore, presentation of a GUI (graphical user interface) composition of multiple TV programs in a single in-band tuner does not allow multiple moving pictures to be displayed simultaneously unless an auxiliary channel is dedicated to transmit a single video picture containing an ensemble of multiple downsized pictures. In such an event, special video editing equipment is required at the Headend to composite the multiple moving pictures from respective channels into a rectangular grid of pictures. Even then, the composition of multiple TV programs would be predetermined and does not offer the viewer the real-time flexibility to navigate interactively through an EPG GUI presentation of simultaneous channel pictures with their respective EPG Data.

The novel EPG executing on a multiple tuner DHCT displays a graphical presentation of multiple channel pictures and their respective EPG Data without noticeable interruption or latency. Furthermore, as the viewer scans or scrolls through channels by pressing keys of an input device, such as a remote control device, the EPG application uses the capabilities of the operating system and DHCT hardware to update the presentation according to the viewer's input. This may involve the CPU 110 and/or the Graphics/Media Memory 132 performing a number of operations to generate a new composited presentation. The performed operations include the removal or writing over a channel's video picture and its respective EPG Data sections in Media Memory 126, repositioning the remaining channels' pictures and respective EPG Data sections in Media Memory 126 to effect a shift of the previously displayed information in the appropriate direction, and inserting the next channel's picture and respective EPG Data into the vacated sections of Media Memory 126. By performing a number of gradual removal and shifting operations of the information of the currently displayed channels from Media Memory 126 and gradually introducing the information of the new channel to be displayed, the composited presentation of the EPG achieves perceived animated scroll.

It will be appreciated that the present invention does not suffer from the limitations imposed by the conditions in which a single tuner home communication terminal can display multiple video pictures. In the present invention, video pictures displayed within an EPG presentation do not necessarily correspond to digital TV programs received over the same 6 MHz RF channel. Rather, this invention features the display of TV programs on the same EPG presentation that do not necessarily correspond to the order of the channels in the channel line-up that are received into the DHCT 14 with multiple in-band tuners from a multiplicity of different transmission channels. The present invention can also unconditionally display a single EPG presentation and multiple video pictures simultaneously, with the display of the corresponding EPG information of each video picture or with each video picture, all ordered within the EPG presentation in increasing channel line-up order. Alternatively, the programs' video pictures and associated information can be displayed in decreasing order of the channel line-up order. Additionally, a program or television channel may not be displayed if blocked by the consumer with channel-blocking or program-blocking functionality provisioned in the DHCT, for instance, via a Configuration menu or screen.

It will be appreciated that the invention also offers the ability for the cable headend operator or subscriber to configure the number of television channels or other services to be displayed and their order, and to configure which channel or service is displayed as the in focus set each time that the EPG is invoked and the position of the in focus set within the EPG presentation. Different embodiments of the display order may be by channel, by program theme or category, by program title, by subscriber favorite channels, by purchasable programming, or by other well known formats. Furthermore, sets of scaled down video pictures with EPG information can be configured to be displayed in order from top to bottom, bottom to top, left to right, right to left, clockwise, or counterclockwise within the displayed EPG presentation. Also configurable by cable operator at head end or by subscriber is the scrolling direction of sets of scaled down video pictures with EPG information. Selections include from top to bottom, bottom to top, left to right, right to left, clockwise, or counterclockwise within the displayed EPG presentation. A default set of configurations may be set by the cable operator and with capability to be overridden by the subscriber through interactive configuration menus or presentations that walk the subscriber through the multiplicity of possible selections. A default configuration may result in the display of the in focus TV channel and corresponding EPG information on the left, right, top, bottom, or any position within a rotating order of sets of TV channels with corresponding EPG information, as well as the position of the in focus channel each time the EPG Application is invoked to present an EPG presentation.

This invention also offers smooth scrolling operation by anticipating a tuning operation. For instance, when a subscriber scrolls through the channel line-up, the EPG Application sets up any requisite tuning operation ahead of time with a non-employed tuner to eliminate or minimize any latency that would ordinarily result from a tuning operation. This results in a cohesive and consistent scrolling experience during the presentation of scaled down video pictures with corresponding EPG information while the subscriber effects scrolling through the EPG presentation.

The invention also offers the capability to display any of the aforementioned EPG presentations in a picture-in picture presentation where the single EPG presentation serves as the larger picture and the TV station that the subscriber was watching immediately prior to invoking the EPG is a smaller scaled down video picture in a corner of the EPG presentation. Moreover, this invention also features flexibility by allowing periodic EPG Data updates to consist of complete or partial EPG Data replacement. Depending on the consumption of the available in-band tuners and the out-of-band tuner, one of multiple methods to receive EPG Data is invoked. The EPG Data is received gradually at one of a multiplicity of lower data rates either via in-band channels or out-of-band channels, or almost instantaneously at one of a multiplicity of high data rates available via in-band channels.

EPG Data typically spans program information for the complete channel line-up, be it hundreds or possibly thousands of channels, for a pre-specified time-window (e.g., 14 or 30 days). An individual service (e.g., NBC, HBO, Video-On-Demand, Email) is typically associated with each channel. Since the duration of programs vary and is typically from 30 minutes to 150 minutes, a channel could possibly offer 48 programs per day. If programs duration are as short as five minutes, this could result in over 100 programs per day. Considering the number of programs per day for each channel, the number of channels, and the number of days of program information, the EPG Data demands an amount of memory that surpasses the typical memory limits of a low-cost, high-volume subscriber device. Additionally, depending on the processor capabilities of the DHCT it may be more efficient to perform sorting operations on the EPG data at the headend, in such embodiments the EPG Server includes in the data multiple sort indices for keys such as program theme or title. Hence, this invention can offer DHCT memory reduction by enabling some of the EPG Data to be stored in EPG Servers, rather than the DHCT, as a result of allowing quick access to EPG Data stored in EPG Servers with a multiplicity of ways to access the data. Once the EPG Data intended to reside in the DHCT's system memory 112 is received and stored in DHCT 14, it offers instant access to program information. However, DHCTs are often low-cost subscriber devices with limited amount of memory. Since the number of programs is very large, program information or attributes that are not practical to be retained in the DHCT's memory must be retrieved from the EPG Server at Headend 26 upon a subscriber's on-demand request. For instance, programs' Long Descriptions (a detailed description of a program) and programs' Previews (a short video-audio clip similar to a movie preview that advertises a program) demand excessive memory, and thus they are stored in the EPG Server. Retrieval of a preview video clip upon a subscriber's on-demand request is a novel aspect of this invention, be it for a program with a future start time or a currently running program. Additionally, preview video for a currently running program could be featured only for those programs with a long running time.

Specific EPG Data requested on-demand may consist of EPG Data that is not typically stored in DHCT's memory for a significant period of time. The subscriber invokes an on-demand request for additional program information by pressing a key, or sequence of keys, on the DHCT's remote control unit or keys on an alternative input device such as on a front panel of the DHCT. Alternatively, the on-demand request may be generated as a result of pressing a key or sequence of keys on a keyboard or generating a command with an input device. Such invocation results in signals received by infrared or UHF port 128, or a similar input port, be it wired or wireless, that interrupts or signals the CPU 110 and provides the viewers input to the CPU in a data format that is recognizable by the CPU. As time progresses, EPG Data is periodically updated due to one of a number of reasons. Changes may result as time progresses since part of the EPG Data time-window becomes past, due to the fact that past program data may become obsolete when the time-window "shifts" in pre-specified time-increments into the future. As time progresses, TV stations or other services (e.g., digital music services) may also alter their program offering due to one of many possible reasons (e.g., NBC overrides scheduled program to transmit the State of the Union Address). EPG Data may also be updated due to a change in the channel line-up. Further, other applications that the user may interact with via the DHCT, such as Internet access, may require system memory occupied by the EPG data. The EPG application will be asked to unload that data, and can reload it when the user re-activates the EPG application.

DHCTs according to the present invention enable a client-server model that expands the number of ways in which EPG Data can be obtained, transmitted and received. Ultimately, the subscriber benefits from the versatility to receive EPG Data from multiple downstream channels, from uninterrupted picture transmission, and with minimized latency while viewing the presentation of multiple scaled down pictures displayed simultaneously with their respective EPG Data. An EPG Data Provider can be physically located anywhere, locally in the Headend or at another distant location in the DBDS network, or even externally on the Internet. The interconnection of regional networks with higher networks allows the flow of EPG Data across many paths to and from many sources. EPG Data is loaded into the network by the EPG Server for delivery to the subscriber. The DBDS of the present invention recognizes where to connect to receive and store in EPG Servers the most current EPG Data on a periodic schedule, and how to check for updates and changes. Accordingly, the DBDS allocates sufficient resources to receive EPG Data from one or more EPG Data Providers, coalesce multiple EPG Data sets into one, organize and, if necessary, compress it into a pre-specified format suitable for reception and interpretation by the EPG application running on DHCTs 14.

According to one aspect of the invention, part of the EPG Data may be retained at the Headend's EPG Server for on-demand requests by DHCTs. This can be done case for Program Long Descriptions and Program Previews that require excessive DHCT 14 memory, especially in light of the large number of programs offered by a DBDS and an EPG Data time-window of multiple days. The remainder of the EPG Data is intended to reside in the DHCT 14 and is broadcast via one or more downstream data channels, possibly multiple in-band channels and/or multiple OOB channels. Each data channel is broadcast in a continuous cyclical mode that resembles a Data Carousel (i.e., the Carousel DTC 68). In another embodiment, the on-demand data may reside outside the DBDS network, and be retrieved by the EPG Server as requested by the EPG Client, perhaps being cached in the EPG Server as in a standard HTTP Proxy Server.

Once the EPG Data is organized into a set of components or multiple subsets, each possibly serving as a redundant EPG Data entity, the DBDS transmits the EPG Data with associated delivery information that notifies authorized DHCTs 14 of the EPG Data version and Data status via unscheduled updates or periodic updates. The EPG daemon task launched by the EPG software application running on the DHCT 14 can compare the EPG Data version to previously received EPG Data to determine if new EPG Data should be received or ignored. Since EPG data is copious and cyclically broadcast through carousel DTCs 68, it is imperative that the DHCT have the capability to ignore unnecessary EPG data that has already been received or that is not pertinent to a particular DHCT 14, thus avoiding consumption of CPU and memory resources in the DHCT 14. Alternatively, the daemon task may receive a message generated by the EPG Server that signals a version update and/or status change to the DHCT and the EPG's daemon task wakes up and conducts the described version and status information comparison for confirmation purposes and receives the new EPG data.

The capability to ignore broadcast EPG data within a tuned channel is provided with programmable matching filters within the demultiplexer/parser 118 in DHCT 14, discussed above. Carousel DTCs are assigned a unique program identification (PID) as allowed by the MPEG-2 standard. Registers corresponding to the programmable matching filters assigned to each tuner are loaded with desired PID and next version number for EPG Data. Alternatively, the matching filters can facilitate recognition of any version number other than the one corresponding to the EPG data in the DHCT 14 by programmable don't care bits and circuitry effecting other logical operations, such as the "NOT" logical operation.

Subscribers that purchase the EPG service (typically by paying a monthly fee) are authorized access to the EPG Data through the EPG Application that executes in the DHCT, in communication with Security Processor 30 and possibly other Conditional Access in components in the DHCT and DBDS. The software application executes by employing the compute resources of the DHCT (memory and CPU), accessing EPG data through a mechanism that receives and coalesces EPG Data using one of a multiplicity of ways of receiving the EPG Data into the DHCT. The EPG daemon task within an authorized DHCT can receive and organize EPG Data into an EPG Database in the DHCT, which is located within the system memory 112, Media Memory 126, or both, or at a storage device within the DHCT 14 or a storage device externally connected to the DHCT 14. Receiving EPG Data may require receiving EPG Data subsets through different channels, possibly in-band or out-of-band (OOB) channels, or both. Albeit redundant, each EPG Data subset is transmitted downstream through multiple channels to provide the DHCT 14 with versatility and flexibility in receiving EPG Data. Depending on the machine-state or condition that the DHCT 14 is in, the novel EPG employs the most suitable method to receive the EPG Data. The most suitable method is the one determined by the EPG software application to provide the best benefit to the subscriber: least interruption of pictures being viewed, least latency in presentation of program information, least latency of GUI composition, and least number of channel tuning glitches. Consequently, the EPG application in the DHCT 14 selects to receive EPG data via one or more channels that are most suitable for the current machine-state.

In another aspect of the invention, the complete EPG Data set, rather than subsets thereof, can be transmitted through multiple downstream channels to present multiple paths to the DHCT 14 in which to receive the EPG Data. The employment of redundancy via multiple downstream channels provides versatility in accessing the EPG Data with the multiple tuners in the DHCT 14. The EPG Data is periodically transmitted in cyclical fashion via multiple Data Carousels. Copies of subsets or all of the EPG Data are transmitted through the multiple channels to offer redundancy. The DHCT 14 does not receive redundant data but responds real-time to obtain a single copy of the desired EPG Data as to provide the best benefit to the subscriber. Benefits include reduction in Boot Time (powering up the DHCT 14) thereby providing video services immediately while proceeding to receive the EPG Data as a background task, employing an in-band tuner that is not in operation to receive EPG data through one of the transmission channels. Redundancy also offers the benefit of compensation for malfunction in downstream channels, reduction in latency to receive EPG data such as Program Long Descriptions and Program Previews by employing a DHCT 14 to receive on-demand data through an in-band channel, and avoiding the interruption of one or more pictures (or services) being currently viewed (or listened) via one or more tuners in the DHCT 14. Transmission through multiple downstream channels allows for EPG Data to be transmitted at different rates, enabling the DHCT 14 to tailor reception to the most suitable rate according to its processing load.

In addition to transmitting the EPG Data over one or more in-band digital downstream channels and downstream OOB channels, the EPG Data can be transmitted in assigned analog channels. Albeit a limited amount of data and a slower data rate, the EPG Data may also be encoded in the Vertical Blanking Interval (VBI) of the analog video signal transmitted via an analog RF Channel to provide additional versatility. VBI encompass the first 25 lines of an analog television signal. Thus the VBI signals are used to carry EPG Data as well as other low speed data.

EPG Data typically consists of information describing program attributes such as program starting times and duration, program title, program description, running time, channel identification, actors in program, parental rating, program categories and genre, and audio features (stereo, SAP, mono, Close-Caption, Teletext). The EPG Data may be organized into sets or subsets in any of multiple ways dominated by one or more of the program attributes. When organized by program start time, it facilitates updating the EPG database in the DHCT 14 as the data for past programs becomes obsolete. Multiple versions of each program's title, short description, or other descriptive program attributes are retained in the DHCT's memory or EPG Server. Depending on the space available to display the desired program information on the screen, the appropriate version or instance of the program information that fits within the designated space is employed. Abbreviated or elaborate versions of program information are desirous for the different EPG presentations (or views). They are also beneficial for use in the presentation of the EPG Data in a channel-time grid because the space available to display information will change with the progression of time and with subscriber invoked navigation in the time axis.

Program description may consist of two versions, a shorter description suitable to be stored in the DHCT's 14 memory and a longer program description that the subscriber can download on-demand by pressing a key on the remote control device. A small image representation of the designated key to press to retrieve a program's Long Description is displayed in the EPG's Graphical User Interface (GUI) adjacent to textual information conveying "Long Description" or similar, possibly shorter, information.

A subscriber's request for a program information stored in EPG Server (e.g., program's Long Description) generates a signal that is transmitted from the DHCT 14 through its OOB transmitter 108 through the RDC (Reverse Data Channel) 80 to the EPG Server in the Headend 26. The EPG Server transmits the requested program information via one or more downstream data channels and the DHCT 14 conveniently downloads the information through one of its multiple tuners without interrupting the displayed picture. When multiple video pictures are displayed within the EPG GUI or other "multiple video pictures" presentation, under certain circumstances the DHCT 14 may be required to sacrifice one of the displayed video pictures because it needs to resource a tuner to retrieve data. In such event, the DHCT's 14 EPG application maintains the moving picture for the channel for which program information was requested and retains a static picture in-situ for each channel for which it had to momentarily relinquish reception of video signals to employ the respective tuner for data reception. Hence, the tuner corresponding to the program for which program information is being requested is maintained "tuned" while one or more of the other tuners in the DHCT 14 is momentarily sacrificed to retrieve the program information. However, this scenario occurs only if necessary since a non-employed tuner may be available to retrieve the requested program information. For instance, the DHCT 14 may contain an ample number of tuners. Or reception of the displayed video pictures continues without interruption when the pictures being viewed are multiplexed digital video signals transmitted over one or more common in-band digital 6 MHz RF channels that don't need to be momentarily relinquished Because the programs of multiple TV channels can be broadcast within a single QAM modulated 6 MHz RF space, sequential channels in the channel line-up can be often carried by one or two 6 MHz RF sections.

In alternate embodiment of the invention in which there is sufficient downstream bandwidth but not sufficient memory in the DHCT, EPG program information that would ordinarily be retrieved on-demand from an EPG Server is transmitted in cyclical fashion through one or more Carousel DTCs. Upon request for such EPG information, for instance Program Long description or Program Video Preview, the EPG Application running in the DHCT enacts a tuner in the DHCT to tune and sets corresponding filter values in its filter circuitry to receive the requested EPG information from the respective Carousel DTC. Alternatively, such EPG information may be available to be received through both, Carousel and On-demand DTCs. The DHCT makes the most suitable choice on how to receive the EPG information according to its present circumstances. Yet in another embodiment, part of the information, such as Program Long Descriptions may be transmitted through Carousel DTCs but Program Video Previews are designed to be transmitted via On-demand DTCs given their larger bandwidth requirements.

B. Transmission of EPG Data

In presence of DHCT's 14 with multiple tuners in the DBDS, the EPG Data is transmitted on multiple channels to avoid imposing a high bandwidth consumption on a single channel and to offer redundancy for DHCT 14 flexibility in downloading EPG Data, such flexibility likely resulting in less latency in Data access. Digital Broadcast signals are sent from the headend to the DHCT 14 via the Broadcast DTC 64, 68, 72. EPG Data packets are multiplexed into the MPEG-2 transport stream; the headend can introduce locally generated data into this stream to complement EPG Data from one or more EPG Data Service Providers. Such local generated data may represent EPG data for local TV stations, Pay-Per-View channels, or Video-On-Demand channels.

Data transport can be accomplished via a dedicated 6 MHz RF channel to a Data Carousel DTC. The DHCT 14 can tune to a dedicated Data Carousel channel for high volume (and high data rate) EPG data delivery. A Data Carousel is multiplexed as IP data into the MPEG-2 transport stream. One or more unique Carousel DTCs can also be multiplexed in each of a multiplicity of digital 6 MHz RF sections, or a subset thereof, or in all, thereby resulting in EPG Data available at lower data rates but as alternate and redundant to the EPG Data transmitted over the dedicated high-speed Carousel DTC. And in some networks where EPG Data may be trickled through the FDC, it serves as an augmentation and a redundant manner of transmitting EPG data. Therefore, the DHCT 14 has the versatility in receiving EPG Data in one of multiple possible ways. Redundancy is useful, for example, in the event of OOB channel malfunction. Different sets of Carousel DTCs may be designated to carry EPG Data at different rates, serving the transmission redundancy objective and the capability to carry higher priority subsets within the EPG data at higher data rates. IP data can be multiplexed into the MPEG-2 transport stream by the media servers. Thus, the EPG Server can use these DTCs for data transport needs associated with requested EPG Data by DHCTs 14, such as long Program Descriptions. Unless under a malfunction scenario, Out-Of-Band communications are always available to the DHCT 14, no matter which DTC channel is tuned. Hence, part of the OOB bandwidth capacity can be used to send EPG Data at lower rates. The OOB channel sends control and signaling flows between the DHCT 14 and the EPG Server and thus supports on-demand EPG Data requests by DHCTs 14. In addition to carrying the out-of-band traffic to the DHCT 14, the Forward Data Channel (FDC) can carry EPG Data in Internet Protocol (IP) datagrams at low data rate. This allows the DHCT 14 to receive EPG Data without having to employ any of its in-band tuners. This is beneficial when the DHCT 14 is displaying multiple pictures received over multiple DTCs. It also serves as a redundant path to protect against failure of a Carousel DTC carrying EPG Data.

The OOB Reverse Data Channel (RDC) carries all data traffic from the DHCT 14 to the Headend. On-demand EPG Data requests are carried in IP datagrams via the RDC. The upstream transmissions are packets (or cells) that access the HFC using TDMA (Time Division Multiple Access) on the RDC (which is the upstream Out-Of-Band channel). Encryption can be applied to the OOB channels to provide privacy. On-Demand DTCs transport requested video and data, including EPG Data inserted by EPG Server in the Headend in response to viewer request. Some DTCs are assigned a priori as On-demand channels for carrying EPG Data stored in EPG Server, such as for the compressed video and audio pertaining to a subscriber-requested Program Preview and for IP datagrams containing a Program Long Description. In some systems, on-demand channel resources are allocated when they are requested and released at the end of an on-demand request.

Analog broadcast signals are passed through the network directly to the DHCT 14 via ATCs. EPG Data can be sent along with the video image in the Vertical Blanking Interval (VBI), which is then processed by the DHCT 14. The Telephony Return is used as an upstream OOB channel in one-way HFC plants. The Telephony Return can be used for upstream signaling. The dial up telephony modem is typically used as a one-way upstream path with an FDC OOB channel being used for the downstream channel.

The DTC is the high data rate delivery mechanism for video, audio, and data. However, each one of the DHCT's 14 multiple in-band tuners may simultaneously receive, be it by design or per a DHCT 14 on-demand request generated via the RDC, independent (video/audio/data) services or EPG Data. For example, a subscriber upon entering the EPG (by pressing Guide Key in remote control device) may obtain a Display of graphical and textual information associated with programs for the channel being viewed and adjacent line-up channels. Simultaneously, the EPG displays spatially downscaled video pictures of these respective channels. The additional videos can be obtained by employing the additional tuners as necessary or by decoding digital video programs multiplexed within the same DTC.

FIGS. 5A-5E show illustrative screens enabled by the DHCT 14, including video images and Electronic Program Guide arrangements, according to multiple aspects of the invention. It should be appreciated that the figures are merely illustrative of some of the functions of the multiple-tuner DHCT 14 of the present invention, and that a vast number of additional formats can be accomplished using the device of the present invention. Furthermore, the features shown in the figures can be implemented through the use of graphical interfaces, windows, layering, or any well known method of displaying multiple windows simultaneously on a display or television, including the concepts of chroma keying, alpha-blending, off-screen composition, scaling of video, and superposition of the scaled video pictures discussed with reference to FIGS. 3 and 4.

Figure 5A:
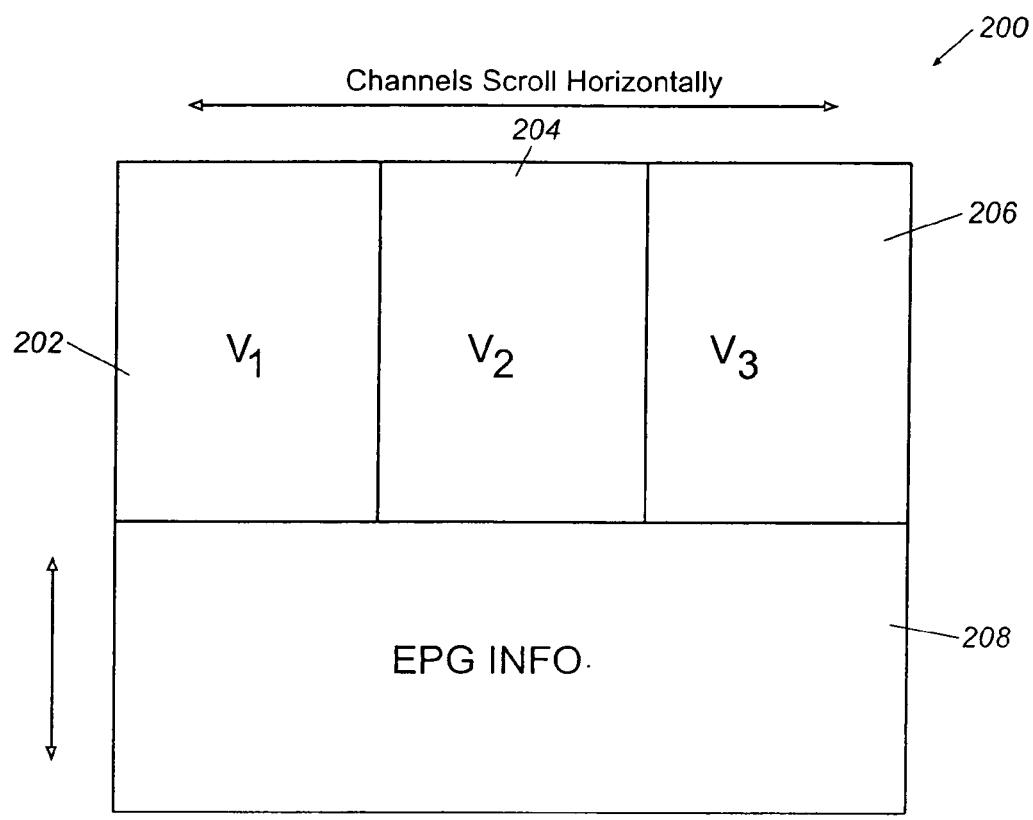
FIGS. 5A-5E show illustrative screens enabled by the DHCT, including video images and Electronic Program Guide content, according to one aspect of the invention.

FIG. 5A illustrates a display screen 200 having three active videos playing thereon, as indicated by frames V1 202, V2 204 and V3 206. According to the present invention, all three videos may be playing in real-time without degradation of signal quality. FIG. 5A also illustrates a frame indicating EPG information 208, at the lower portion of the screen. In particular, EPG information can correspond to the programs' scaled-down video pictures displayed in the presentation. As shown in the figure, the EPG information 208 may be viewed by a subscriber through the use of a remote control. The subscriber can use arrow keys on the remote control to scroll though EPG information 208 for any channels that may be available to the subscriber. Thus, according to the present invention, a viewer may simultaneously view three videos and EPG information.

A subscriber using the DHCT 14 of the present invention can also scroll the three video channels 202, 204, 206 horizontally so that the subscriber can add one new channel to one side of the screen (i.e., in either position V1 or V3), and remove an already displayed channel on the opposite side of the screen (i.e., in either position V3 or V1). The subscriber can accomplish this via arrow keys on the subscriber's infrared (or radio controlled) remote control. As stated above, after the subscriber makes a selection, the CPU 110 determines the appropriate course of action, and executes a change of television channels to be displayed and the corresponding EPG data for those channels. As will be appreciated by those of skill in the art, a single TV channel change can occur by decoding another video program transmitted over the same DTC without having to exercise a new tuning operation. However, if the requested TV channel is not carried digitally within the tuned DTC, a tuning operation will be required as in single tuner DHCTs 14. With the multiple-tuner DHCT 14 of the present invention, a TV channel change can occur by employing a secondary tuner to receive the new TV channel. In FIG. 5 A, the program information can be in rows or in columns so that program info is respectively with the corresponding displayed video picture; edges collinear with the videos on the top part of the display All then would scroll horizontally.

Figure 5B:
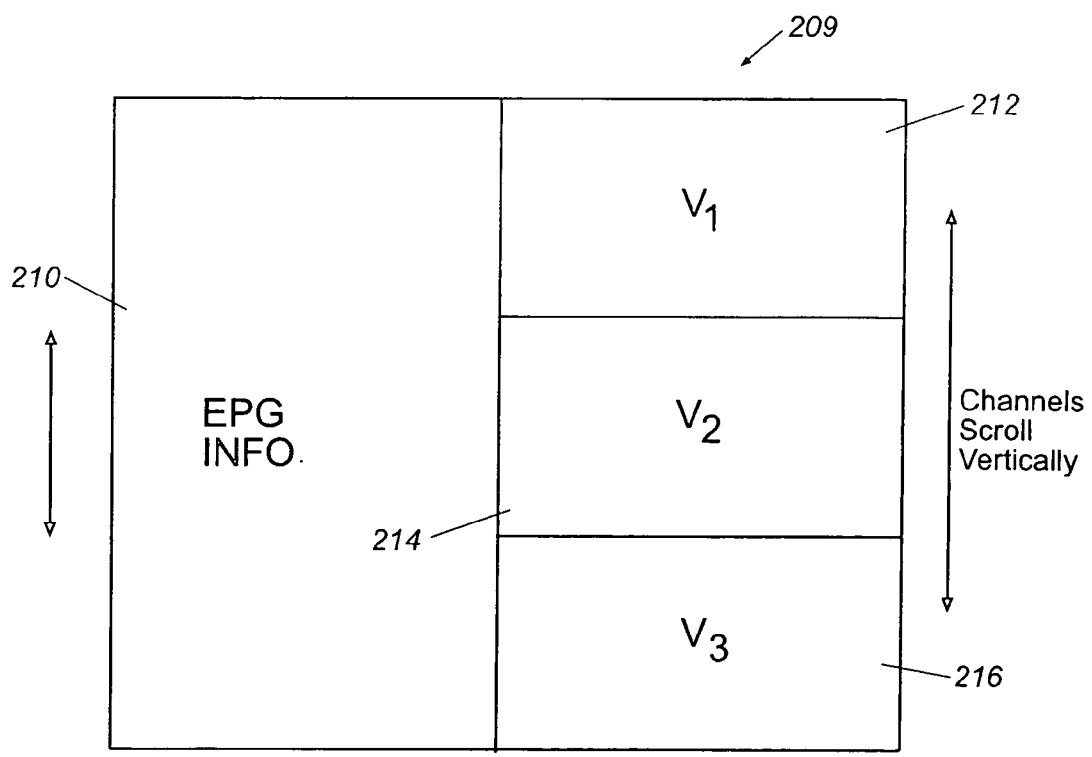

Additionally, it should be appreciated that each one of the frames 202, 204, 206 and 208 may be manipulated by the subscriber without affecting each other frame. Therefore, the subscriber can lookup EPG information 208 on any channel the subscriber desires, including the three video channels already displayed. Therefore, the operation of each frame on the screen is totally independent of each other frame, except where functions such as scrolling may be employed. The display screen shown 209 in FIG. 5B is substantially identical to that figure shown in FIG. 5A, except that the screen is turned 90 degrees. In the embodiment shown in FIG. 5B, a subscriber can scroll the video channels 212, 214, 216 and EPG information 210 vertically through the use of a remote control.

Figures 5C, 5D:
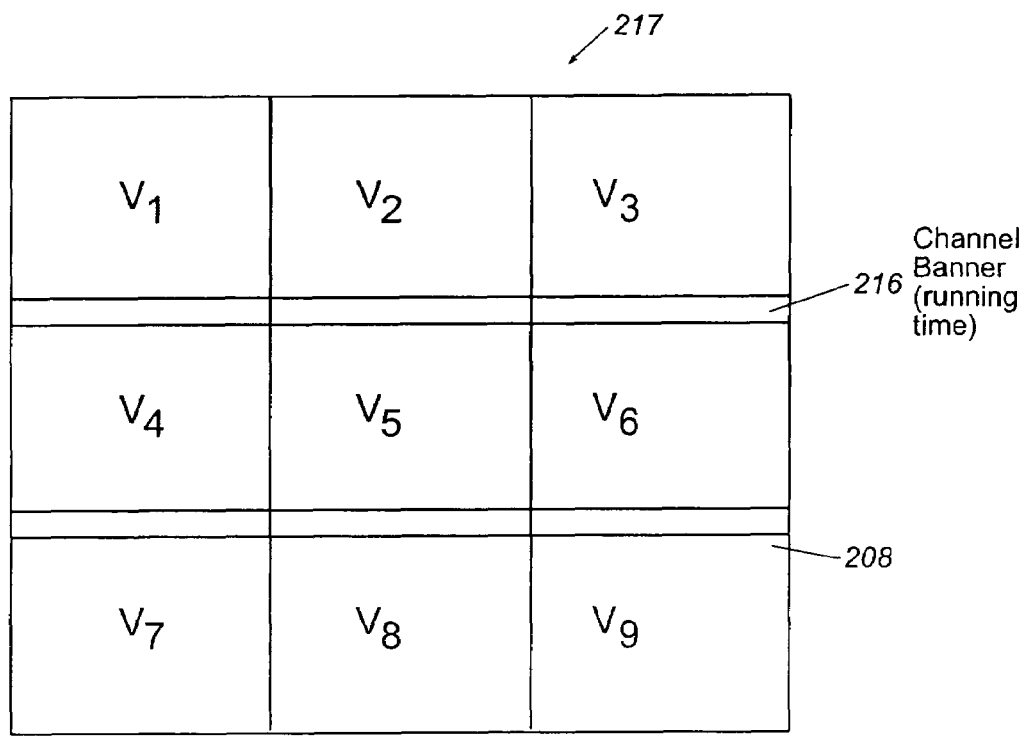

FIG. 5C shows yet another display 217 facilitated by the present invention. In FIG. 5C, nine separate videos are simultaneously being viewed. Although these video frames are shown to be of equal size, the DHCT of the present invention may allow a user to change the size of any of all of the videos. Additionally, each of the respective videos can include a channel banner 216 at the bottom portion thereof which can indicate EPG information, such as the program's running time or title. In one possible arrangement of FIG. 5C, the TV station that was immediately tuned prior to subscriber invoking the EPG presentation is displayed as a scaled down video picture in the center as $V_5$ with or without its corresponding EPG information, and possibly represented as the in focus program. Thus this results in the aforementioned picture-in-picture display of an EPG presentation and the currently tuned TV station. The surrounding scaled down video pictures, all either with or without their respective EPG information, are additional sets of scaled down video pictures arranged in the configured order. Order can be increasing or decreasing channel line-up order, either clockwise or counterclockwise as configured. Upon subscriber effecting navigation through the channel line up, each scrolling event results in the removal of a presented set from the screen and the introduction of a new set. Alternatively, in a non-picture-in-picture EPG presentation mode, the order could be raster-scan like, that is, within rows channel line-up order is from left to right, then proceeding to left of the next immediate row below the current row. A column wise ordering can be configured similarly. Although FIG. 5C shows nine sets of video pictures with their respective EPG information, a similar grid of 2 columns and 2 rows can be configured with any of the respective display and scrolling orders. FIG. 5D shows a similar nine-block arrangement, as in FIG. 5C. However, FIG. 5D illustrates that the electronic program guide may be used by a subscriber to view all programs playing on one channel at multiple times of the day. For instance, as shown in FIG. 5D, a subscriber can view all of the programs at 9:00 through 1:00, in half-hour increments, for any given channel.

Depending on the data provided by the electronic program guide, the blocks may each indicate a title of the show, or more detailed description for each time slot. Additionally, each time slot can show a graphical display indicating the shows title or another feature to otherwise identify the show. For future times, the scaled down video picture may be that of a program's video preview or a static image representative of the program with the program's textual information, or merely textual information.

Figure 5E:
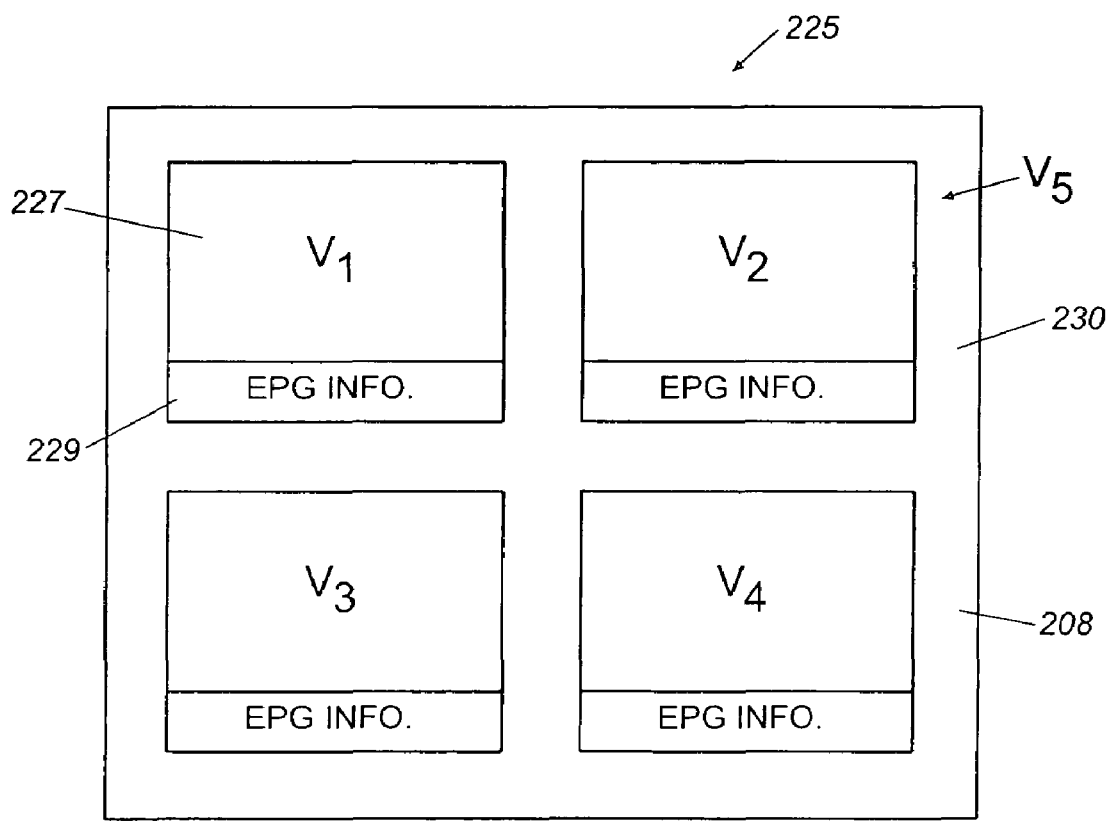

Finally, FIG. 5E shows a display 225 having five independent videos, four of which have their own EPG information. For example, the video in the upper left-hand corner 227 has associated with it an electronic program guide information box 229 at the bottom thereof. This figure illustrates that the present invention can be used to show both multiple videos and multiple program guide information for corresponding channels simultaneously so that a user can effectively navigate multiple channels while receiving program information for each channel viewed. Additionally, these may be displayed on top of a video 230 that the subscriber is already viewing.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method implemented by a digital home communication terminal (DHCT) for enabling a user to scroll through a plurality of video programs received via a plurality of transmission channels, comprising the steps of:
   tuning to a first plurality of transmission channels via a plurality of respective tuners;
   receiving a first plurality of video programs including a first video program and a second video program via the first plurality of transmission channels, wherein each of the first plurality of video programs comprises a plurality of time-sequential pictures;
   outputting the first plurality of video programs to a display device configured to simultaneously display the first plurality of video programs, wherein a first video program is displayed in a first video display area of the display device and a second video program is displayed in a second video display area of the display device;
   receiving via a tuner a program guide data including program information related to the first video program and program information related to the second video program and program information related to a third video program;
   outputting the program guide data to the display device simultaneously with the first plurality of video programs in a default display order, as configured by a headend that sent the program guide data, wherein the program guide data includes an order option for the user to override the default display order and manually arrange the plurality of video programs with the program guide data, wherein at least a portion of the program information related to the first video program is displayed at a location corresponding to the first video program and at least a portion of the program information related to the second video program is displayed at a location corresponding to the second video program;
   receiving, from a user during the outputting of the program guide data simultaneously with the first plurality of video programs, a request for program information related to at least one of the plurality of programs;
   in response to receiving the user request for program information related to at least one of the plurality of programs, suspending, at the DHCT, at least one of the plurality of tuners from tuning to the respective transmission channels;
   utilizing the suspended tuner for receiving at least a portion of the requested program information; and
   outputting a static image in the display area corresponding to the video program previously provided by the suspended tuner.

2. The method of claim 1, further comprising, responsive to receiving the user input:
   outputting to the display device program guide data that includes at least a portion of the program information related to the second video program and at least a portion of the program information related to the third video program, wherein the at least a portion of the program information related to the second video program is displayed at a location corresponding to the second video program and the at least a portion of the program information related to the third video program is displayed at a location corresponding to the third video program.

3. The method of claim 1, further comprising scaling down the spatial resolution of the first and second video programs prior to outputting the first and second video programs to the display device.

4. The method of claim 1, wherein the first video display area and the second video display area of the display device are non-overlapping and have a substantially equal display area.

5. The method of claim 1, wherein the step of outputting the first plurality of video programs to the display device is performed responsive to user input provided by a single activation of a single input key.

6. A method for enabling the simultaneous viewing of video programs and related electronic program guide information, comprising:
   receiving a plurality of video programs substantially simultaneously by tuning to a plurality of transmission channels via a plurality of respective tuners, the plurality of video programs including a first video program and a second video program, wherein the first and second video programs each comprise a plurality of time-sequential pictures;
   receiving via a tuner a program guide data including program information related to the first video program and program information related to the second video program;
   receiving a first user input from a user;
   responsive to receiving the first user input outputting to a display device a television signal comprising a simultaneous visual presentation of the plurality of video programs with program guide data, wherein the first and second video programs are located in respective first and second video display areas of the visual presentation and the program guide data includes at least a portion of program information related to the first video program and at least a portion of program information related to the second video program, wherein the location of the first and second video display areas and the program guide data is determined at a headend that sent the program guide data, wherein the program guide data includes an order option for the user to override the location of the first and second video display areas and manually arrange the first and second video display areas with the program guide data;

receiving, from a user during the outputting of the simultaneous visual presentation of the plurality of video programs with program guide data, a request for program information related to at least one of the plurality of programs;

in response to receiving the user request for program information related to at least one of the plurality of programs, suspending at least one of the plurality of tuners from tuning to the respective transmission channels;

utilizing the suspended tuner for receiving at least a portion of the requested program information; and outputting a static image in the display area corresponding to the video program previously provided by the suspended tuner.

7. The method of claim 6, further comprising:

receiving a second user input; and responsive to receiving the second the user input:

outputting to the display device a second plurality of video programs including a third video program and the second video program, wherein the second video program is displayed in the first video display area of the visual presentation and the third video program is displayed in the second video display area of the visual presentation;

outputting to the display device at least a portion of the program information related to the second video program and at least a portion of the program information related to the third video program.

8. The method of claim 6, wherein the first video program is displayed in the first video display area of the visual presentation and the second video program is displayed in the second video display area of the visual presentation, and wherein the at least a portion of the program information related to the first video program is displayed at a location corresponding to the first video program and the at least a portion of the program information related to the second video program is displayed at a location corresponding to the second video program.

9. The method of claim 6, further comprising scaling down the spatial resolution of the first and second video programs prior to outputting the first and second video programs to the display device.

10. The method of claim 6, wherein the first video display area and the second video display area of the visual presentation are non-overlapping and have a substantially equal display area.

11. The method of claim 6, wherein the step of outputting the program guide data and the plurality of video programs simultaneously to the display device is performed responsive to the first user input provided by a single activation of a single input key.

12. A digital home communication terminal (DHCT) configured to enable a user to scroll through a plurality of video programs received via a plurality of transmission channels, comprising:

a plurality of tuners configured to substantially simultaneously tune to a first plurality of transmission channels carrying a first plurality of video programs including a first video program and a second video program;

memory configured to store executable instructions; and at least one processor that is programmed by the executable instructions to enable the DHCT to:

output the first plurality of video programs to a display device configured to simultaneously display the first plurality of video programs in a default display order, as configured by a headend that sent the program guide data, wherein a first video program is displayed in a first video display area of the display device and a second video program is displayed in a second video display area of the display device;

receive via at least one tuner a program guide data including program information related to the first video program and program information related to the second video program, wherein the program guide data includes an order option for the user to override the default display order and manually arrange the plurality of video programs with the program guide data;

output the program guide data to the display device simultaneously with the first plurality of video programs, wherein at least a portion of the program information related to the first video program is displayed at a location corresponding to the first video program and at least a portion of the program information related to the second video program is displayed at a location corresponding to the second video program;

receive, from a user during the outputting the program guide data with the first plurality of video programs, a request for program information related to at least one of the plurality of programs;

in response to receiving the user request for program information related to at least one of the plurality of programs, suspend at least one of the plurality of tuners from tuning to the respective transmission channels;

utilize the suspended tuner for receiving at least a portion of the requested program information; and output a static image in the location corresponding to the video program previously provided by the suspended tuner.

13. The DHCT of claim 12, wherein the at least one processor is further programmed by the executable instructions to enable the DHCT to:

tune to a second plurality of transmission channels substantially simultaneously, wherein the second plurality of transmission channels and the first plurality of transmission channels both include at least one common transmission channel; and receive the second plurality of video programs including the second and third video program via the second plurality of transmission channels.

14. The DHCT of claim 12, wherein the at least one processor is further programmed by the executable instructions to enable the DHCT to:

receive program guide data including information related to the first video program and information related to the second video program;

output the program guide data to the display device, wherein the at least a portion of the program information related to the first video program is displayed at a location corresponding to the first video program and the at least a portion of the program information related to the second video program is displayed at a location corresponding to the second video program.

15. The DHCT of claim 12, wherein the at least one processor is further programmed by the executable instructions to enable the DHCT to:
output to the display device the program guide data that includes at least a portion of the program information related to the second video program and at least a portion of the program information related to the third video program, wherein the at least a portion of the program information related to the second video program is displayed at a location corresponding to the second video program and the at least a portion of the program information related to the third video program is displayed at a location corresponding to the third video program.

16. The DHCT of claim 12, wherein the at least one processor is further programmed by the executable instructions to enable the DHCT to output to the display device a video program that is displayed in the background of the first and second video programs.

17. The DHCT of claim 12, wherein the at least one processor is further programmed by the executable instructions to enable the DHCT to store program guide data related to the first and second video programs in the memory in the DHCT.

18. A method implemented by a digital home communication terminal (DHCT) having a plurality of tuners, comprising the steps of:
receiving a first video program via a first tuner;
receiving a second video program via a second tuner;
receiving via at least one tuner a program guide data including program information related to the first video program and program information related to the second video program;
receiving user input from a user;
outputting the first and second video programs to a display device for display in respective first and second display areas of a default display order as configured by a headend that sent the program guide data, responsive to receiving the user input, wherein the program guide data includes an order option for the user to override the default display order and manually arrange the plurality of video programs with the program guide data;
outputting at least a portion of program information related to the first and second video programs to the display device responsive to receiving the user input;
receiving, from a user during the outputting of the program guide data simultaneously with the first plurality of video programs, a request for program information related to at least one of the plurality of programs;
in response to receiving a request for program information related to at least one of the plurality of programs, suspending, at the DHCT, at least one of the first tuner and the second tuner from receiving a video program;
utilizing the suspended tuner for receiving at least a portion of the requested program information; and
outputting a static image in the display area corresponding to the video program previously provided by the suspended tuner,
wherein the first and second video programs and the program guide data are displayed simultaneously by the display device.

19. The method of claim 18, wherein the first program is received as an analog video signal and the second program is received as a digital video signal.

20. The method of claim 18, further comprising receiving the program guide data via a third tuner prior to receiving the user input.

21. The method of claim 18, further comprising receiving substantially simultaneously a third video program with the second video program via the second tuner, wherein the first, second and third video programs are received as respective digital video signals; and responsive to receiving the user input outputting to the display device a television signal comprising a simultaneous visual presentation of the first, second and third video programs with at least a portion of respective program information corresponding to the first, second, and third video programs.

22. The method of claim 18, wherein the first and second video programs are updated for output to the display device at their respective frame rates.

23. A digital home communication terminal (DHCT) configured to enable the simultaneous viewing of video programs and related electronic program guide information, comprising:
a plurality of tuners configured to substantially simultaneously tune to a first plurality of transmission channels carrying a first plurality of video programs including a first video program and a second video program;
at least one tuner configured to receive a program guide data including program information related to the first video program and program information related to the second video program;
memory configured to store executable instructions and the program guide data; and
at least one processor that is programmed by the executable instructions to enable the DHCT to:
output the program guide data and the plurality of video programs simultaneously in a default display order, as configured by a headend that sent the program guide data to a display device responsive to a first user input, wherein the first video program is displayed in a first video display area of the display device and the second video program is displayed in a second video display area of the display device, and wherein at least a portion of the program information related to the first video program is displayed at a location corresponding to the first video program and at least a portion of the program information related to the second video program is displayed at a location corresponding to the second video program, wherein the program guide data includes an order option for a user to override the default display order and manually arrange the plurality of video programs with the program guide data;
receive, from a user during the outputting of the program guide data simultaneously with the first plurality of video programs, a request for program information related to at least one of the plurality of programs;
in response to receiving a request for program information related to at least one of the plurality of programs, suspend at least one of the plurality of tuners from tuning to the respective transmission channels;
utilize the suspended tuner for receiving at least a portion of the requested program information; and
output a static image in the video display area corresponding to the video program previously provided by the suspended tuner.

24. The DHCT of claim 23, wherein the at least one processor is further programmed by the executable instructions to enable the DHCT to:
output, responsive to the DHCT receiving a second user input, a second plurality of video programs including a third video program and the second video program to the display device, wherein the second video program is displayed in the first video display area of the display device and the third video program is displayed in the second video display area of the display device; and output to the display device program guide data that includes the at least a portion of the program information related to the second video program and at least a portion of the program information related to the third video program, wherein the information related to the second video program is displayed at a location corresponding to the second video program and the information related to the third video program is displayed at a location corresponding to the third video program;

wherein the second plurality of video programs and the program guide data are displayed simultaneously to the display device.

25. The DHCT of claim 23, wherein the at least one processor is further programmed by the executable instructions to enable the DHCT to output simultaneously to the display device a video program received as an analog video signal and at least one video program received as a digital video signal.

26. The DHCT of claim 23, wherein the at least one processor is further programmed by the executable instructions to enable the DHCT to store program guide data related to the first and second video programs in memory in the DHCT.

27. The DHCT of claim 23, wherein the at least one processor is further programmed by the executable instructions to enable the DHCT to scale down the spatial resolution of the first and second video programs prior to outputting the first and second video programs to the display device.

28. A DHCT configured to provide a user with program information corresponding to television programs, comprising:

at least one guide tuner configured to receive a program guide data including program information corresponding to a plurality of television programs scheduled on the first television channel;

a plurality of program tuners configured to receive a plurality of television programs, wherein at least one television programs corresponds to a television program to be broadcast in the future on a first television channel;

a first memory configured to store executable instructions; and at least one processor that is programmed by the executable instructions to enable the DHCT to output a television signal comprising a simultaneous visual presentation of the plurality television programs at a plurality of respective display areas and program guide data in a default display order as configured by a headend that sent the program guide data, wherein at least a portion of the program information corresponding to each respective television program in the plurality of sequential television programs is included in the visual presentation, wherein the program guide data includes an order option for the user to override the default display order and manually arrange the plurality of video programs with the program guide data;

wherein the DHCT is configured to receive, from a user during the outputting of the visual presentation and the program guide data, a request for program information related to at least one of the plurality of programs, wherein, in response to receiving the user request for program information related to at least one of the plurality of programs, the DHCT is configured to suspend at least one of the plurality of program tuners from receiving the plurality of television programs and utilize the suspended tuner for receiving at least a portion of the requested program information, and wherein the DHCT is further configured to output a static image in the display area corresponding to the video program previously provided by the suspended tuner.

29. The method of claim 28, wherein the at least one picture and the at least a portion of the program information corresponding to each respective television program are co-located in a respective display area of the visual presentation.

30. A method for enabling the simultaneous viewing of video programs and related electronic program guide information, comprising:

receiving a plurality of video programs substantially simultaneously by tuning to a plurality of transmission channels via a plurality of respective tuners, the plurality of video programs including a first video program and a second video program, wherein the first and second video programs each comprise a plurality of time-sequential pictures;

receiving via a tuner a program guide data including program information related to the first video program and program information related to the second video program;

configuring a memory to output the first plurality of video at a plurality of respective display areas;

configuring an output buffer in the memory with the first video program and the second video program;

configuring the output buffer with a plurality of program information sections including a first program information section for at least a portion of the program information related to the first video program and a second program information section for at least a portion of the program information related to the second video program;

configuring the location of the video section and program information section in the output buffer for each respective video program;

outputting data in the output buffer to a display device in a default display order as configured by a headend that sent the program guide data, wherein the program guide data includes an order option for a user to override the default display order and manually arrange the plurality of video programs with the program guide data;

receiving, from a user during the outputting of the program guide data simultaneously with the first plurality of video programs, a request for program information related to at least one of the plurality of programs;

in response to receiving the user request for program information related to at least one of the plurality of programs, suspending, at the DHCT, at least one of the plurality of tuners from receiving the plurality of video programs;

utilizing the suspended tuner for receiving at least a portion of the requested program information; and outputting a static image in the display area corresponding to the video program previously provided by the suspended tuner.

31. The method of claim 30, further comprising:
receiving user input; and
responsive to receiving the user input:
configuring the memory for a second plurality of video programs including a third video program and the second video program, wherein the scaled time-sequential pictures of the second video program are stored in the first video section and the scaled time-sequential pictures of the third video program are stored in the second video section; and outputting to the display device at least a portion of the program information related to the second video program and at least a portion of the program information related to the third video program.

32. The DHCT of claim 28, wherein the program information comprises a broadcast starting time for the corresponding television program.

33. The DHCT of claim 28, wherein the at least one picture corresponding to each respective television program is associated with the visual content of the respective television program.

34. The DHCT of claim 28, wherein the at least one picture corresponding to each respective television program is a plurality of time-sequential pictures.

35. The DHCT of claim 34, wherein the plurality of time-sequential pictures corresponds to the program currently broadcasting on the first television channel.

36. The DHCT of claim 34, wherein at least one picture corresponding to a respective future scheduled television program in the plurality of television programs is a preview of the respective future scheduled program.

* * * * *